(12) United States Patent
Zong et al.

(10) Patent No.: US 10,983,251 B2
(45) Date of Patent: *Apr. 20, 2021

(54) MANUFACTURING MODULE FOR THE MANUFACTURE OF OPHTHALMIC LENSES

(71) Applicant: Novartis AG, Basel (CH)

(72) Inventors: Shu Zong, Cumming, GA (US); Peter Hagmann, Waldburg (DE); Roger Biel, Aschaffenburg (DE); Axel Heinrich, Aschaffenburg (DE); Stephan Piri, Dietzenbach (DE)

(73) Assignee: Alcon Inc., Fribourg (CH)

( * ) Notice: Subject to any disclaimer, the term of this patent is extended or adjusted under 35 U.S.C. 154(b) by 219 days.

This patent is subject to a terminal disclaimer.

(21) Appl. No.: 16/109,080

(22) Filed: Aug. 22, 2018

(65) Prior Publication Data
US 2019/0064396 A1 Feb. 28, 2019

Related U.S. Application Data

(60) Provisional application No. 62/549,558, filed on Aug. 24, 2017.

(51) Int. Cl.
*B29D 11/00* (2006.01)
*G02B 1/04* (2006.01)
(Continued)

(52) U.S. Cl.
CPC .......... *G02B 1/043* (2013.01); *B29D 11/0048* (2013.01); *B29D 11/00125* (2013.01);
(Continued)

(58) Field of Classification Search
CPC ........ B29D 11/00182; B29D 11/00125; B29D 11/00509; B29D 11/00259;
(Continued)

(56) References Cited

U.S. PATENT DOCUMENTS

| 6,082,987 A | 7/2000 | Su et al. |
| 6,113,817 A | 9/2000 | Herbrechtsmeier et al. |

(Continued)

FOREIGN PATENT DOCUMENTS

| EP | 0183324 A2 | 6/1986 |
| EP | 0183324 B1 | 6/1986 |

(Continued)

*Primary Examiner* — Mathieu D Vargot
(74) *Attorney, Agent, or Firm* — Sheng-Hsin Hu

(57) ABSTRACT

A manufacturing module (MM) for contact lenses comprises a plurality of manufacturing stations (300, 301, 302, 310, 320, 321, 322, 330, 331, 340, 341, 342, 350, 351, 352) arranged in a closed loop and a plurality of lens mold carriers (1, 2) which are transported through the manufacturing stations. Each lens mold carrier (1, 2) comprises a frame (10, 20) having a predetermined number of mounting sites (100, 200) arranged along the frame. Each lens mold carrier (1, 2) further comprises a predetermined number of molds (112, 212) removably mounted to the frame (10, 20) at the mounting sites (100, 200), the molds being reusable male or female molds (212, 112). Two lens mold carriers (1, 2) are assigned to each other to form a pair, so that upon mating the pair of lens mold carriers (1, 2) the male and female molds (212, 112) are mated to form mold cavities defining the shape of the lenses. The manufacturing stations comprise a mold changing station (300, 301, 302) configured to be capable of removing a mold from its mounting (Continued)

site (100, 200) and mounting a different mold at the said mounting site (100, 200), or configured to change the rotational position of a mold (112, 212) mounted to the frame (10, 20), or both.

8 Claims, 10 Drawing Sheets

(51) Int. Cl.
  *G02C 7/02* (2006.01)
  *B29C 35/08* (2006.01)
  *B29L 11/00* (2006.01)

(52) U.S. Cl.
  CPC .. *B29D 11/00173* (2013.01); *B29D 11/00182* (2013.01); *B29D 11/00259* (2013.01); *B29D 11/00509* (2013.01); *G02C 7/027* (2013.01); *B29C 2035/0827* (2013.01); *B29D 11/0023* (2013.01); *B29D 11/0025* (2013.01); *B29D 11/00442* (2013.01); *B29L 2011/0041* (2013.01); *G02C 7/028* (2013.01)

(58) Field of Classification Search
  CPC .......... B29D 11/00173; B29D 11/0048; B29D 11/00038; B29D 11/00519; G02B 1/043; G02C 7/027
  See application file for complete search history.

(56) References Cited

U.S. PATENT DOCUMENTS

| | | |
|---|---|---|
| 6,627,124 B1 | 9/2003 | Herbrechtsmeier et al. |
| 2002/0190405 A1 | 12/2002 | Cameron |
| 2007/0257387 A1 | 11/2007 | Hofmann et al. |
| 2010/0258962 A1 | 10/2010 | Doerr et al. |
| 2011/0089585 A1 | 4/2011 | Biel et al. |
| 2015/0147425 A1 | 5/2015 | Biel et al. |
| 2016/0176092 A1 | 6/2016 | Atkinson et al. |

FOREIGN PATENT DOCUMENTS

| | | |
|---|---|---|
| EP | 0969956 B1 | 11/2004 |
| WO | WO07060173 A1 | 5/2007 |
| WO | WO08116856 A1 | 10/2008 |
| WO | WO09103732 A1 | 8/2009 |
| WO | WO11026868 A1 | 3/2011 |
| WO | WO11045380 A1 | 4/2011 |
| WO | WO11045384 A1 | 4/2011 |
| WO | WO11045397 A1 | 4/2011 |
| WO | WO12066060 A1 | 5/2012 |
| WO | WO12080468 A1 | 6/2012 |
| WO | WO14049050 A1 | 4/2014 |
| WO | WO14049053 A1 | 4/2014 |
| WO | WO15036432 A1 | 3/2015 |
| WO | WO15078798 A1 | 6/2015 |

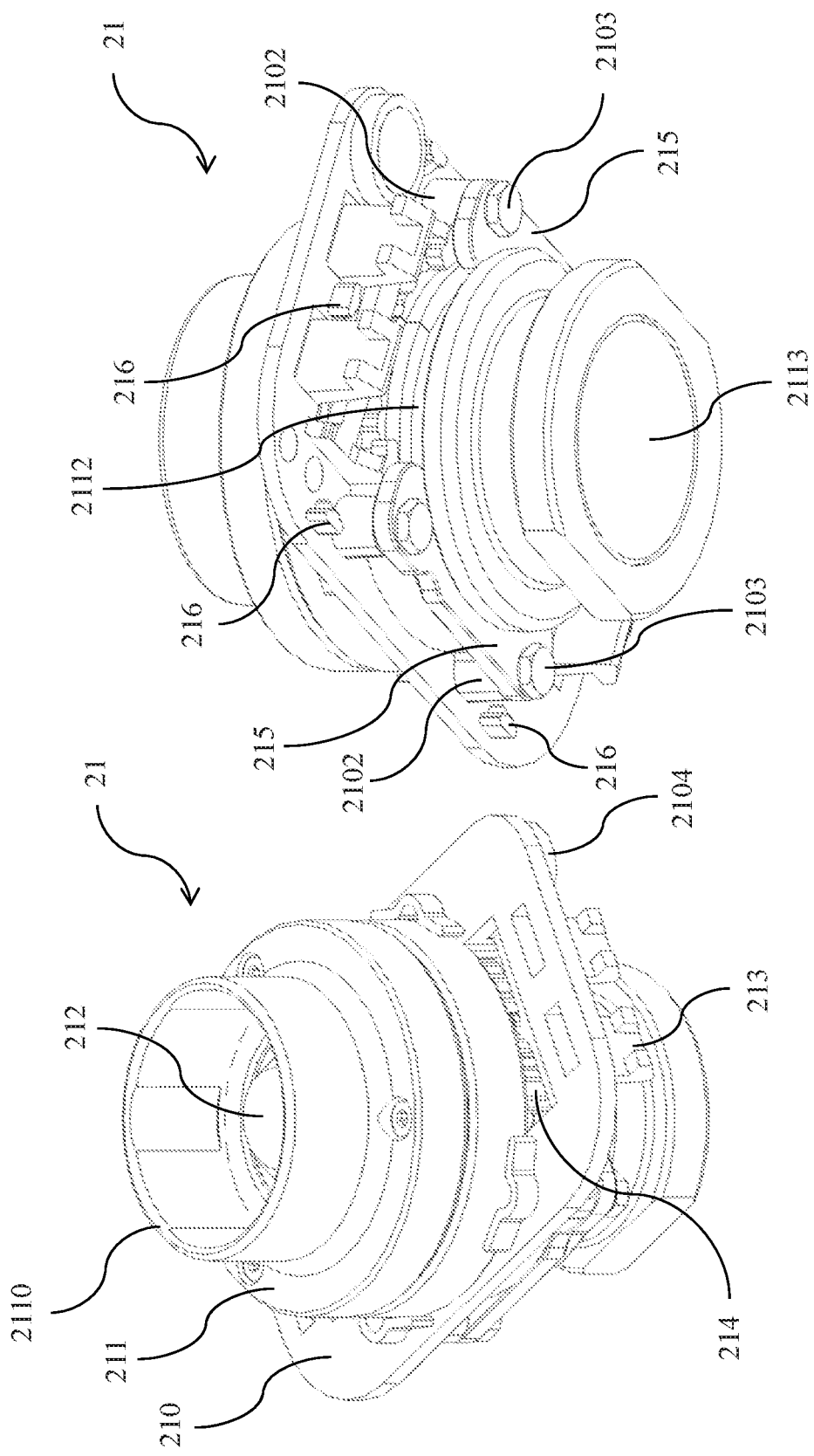

MANUFACTURING MODULE FOR THE MANUFACTURE OF OPHTHALMIC LENSES

This application claims the benefit under 35 USC § 119 (e) of U.S. provisional application No. 62/549,558 filed 24 Aug. 2017, incorporated by reference in its entirety.

The invention relates to a manufacturing module for the manufacture of ophthalmic lenses, in particular contact lenses such as soft contact lenses.

The manufacture of ophthalmic lenses, in particular contact lenses such as soft contact lenses, is typically carried out in fully automated production lines where the contact lenses are produced in high numbers. In particular, contact lenses which are worn only once and which are disposed of after being worn need to be produced in very high numbers. Such contact lenses are produced, for example, in a closed-loop process with the aid of re-usable lens molds made of glass which are used many times to produce the high number of contact lenses.

As regards the manufacture of the contact lenses, each mold typically comprises male and female mold halves which, upon being mated and closed, together form a mold cavity between them defining the geometry of the contact lens to be formed. Initially, a lens forming material is dispensed into one of the mold halves, for example into the female mold half, prior to the mold halves being mated. For the sake of simplicity, in the following it will only be referred to male molds and female molds rather than to male mold halves and female mold halves. After dispensing of the lens forming material into the female mold, the male and female molds are mated and closed, and the lens forming material enclosed in the mold cavity is polymerized and/or crosslinked to form the contact lens. Thereafter, the mold is opened again by separating the male and female molds, the contact lens is removed from either the male mold or the female mold, and the contact lens is then advanced for being further processed.

For example, in case the contact lens is a silicone hydrogel contact lens, solvents contained in the lens forming material which are also contained in the contact lens formed therefrom as well as any non-polymerized and/or non-crosslinked lens forming material need to be extracted from the contact lens. Also, a coating can be applied to the contact lens in order to improve lubricity of the contact lens to increase comfort when the contact lens is worn on the eye. For these purposes, the contact lenses may be transported through different baths (extraction baths, water baths, coating baths) before the extracted and coated contact lens is further advanced for getting inspected.

Inspection of the contact lens is then performed and may comprise an inspection for defects of the contact lens such as bubbles, inclusions, edge defects, other cosmetic defects, etc., but may in addition also comprise measurement of the optical characteristics and the central thickness of the contact lens.

Once the contact lens has successfully passed inspection it is advanced to the primary packaging station where it is placed into a packaging shell. Packaging liquid is then dispensed into the packaging shell, and a foil is placed onto the shell and is heat-sealed thereto.

As regards the molds used in the manufacture of the contact lens, once the contact lens has been removed the male and female molds are cleaned, rinsed and dried and are then re-used to manufacture the next contact lens in the manner described above.

In the manufacture of contact lenses, typically a number of lots of contact lenses are produced on the production line at the same time with the aid of a plurality of lens mold carriers which are transported through the manufacturing stations of the production line. Each lens mold carrier comprises a frame having a predetermined number of mounting sites arranged at predetermined locations along the frame (for example fourteen mounting sites), and these predetermined number and locations of the mounting sites are identical for each lens mold carrier. Each lens mold carrier further comprises a predetermined number of mold units (for example fourteen mold units), which are removably mounted to the lens mold carrier, and each mold unit comprises either a reusable male mold or a reusable female mold. However, all molds of one lens mold carrier are of the same type, i.e. either all of them are male molds or all of them are female molds. Two lens mold carriers (one male lens mold carrier and one female lens mold carrier) of the plurality of lens mold carriers are assigned to each other to form pairs of lens mold carriers. Accordingly, at the mounting sites of one of the lens mold carriers of a pair of lens mold carriers male molds are arranged while at the mounting sites of the other lens mold carrier of a pair of lens mold carriers female molds are arranged, so that upon mating the lens mold carriers of the pairs the respective male and female molds are mated in order to form mold cavities defining the shape of the contact lenses to be manufactured.

By way of example, one lens mold carrier may be equipped with seven pairs of molds (fourteen molds in total), with the two molds of one pair being identical and being mounted to the frame at adjacently arranged locations (i.e. the first pair of molds is arranged at mounting locations number one and two, the second pair of molds is arranged at mounting locations number three and four, and so on), so that with one carrier it is possible to manufacture seven pairs of contact lenses with different geometries, i.e. seven different lots at the same time (each of the seven pairs of molds forming a different lot). Each individual lens mold carrier of the plurality of lens mold carriers on the production line is equipped with the same molds in the same sequence, that is to say each individual lens mold carrier of the plurality of lens mold carriers on the production line is equipped with the same molds at the same mounting locations of the respective carrier. As a result, for example, contact lenses manufactured with the molds of the first pair (i.e. the mold halves at mounting location number one and mounting location number two of each of the lens mold carriers) always have the same geometries. This also holds for the other pairs (lots).

Before starting manufacturing, configuration of each of the individual lens mold carriers is performed off-line (each of the lens molds carriers is equipped at the individual mounting locations with the same molds in the same sequence). The lens mold carriers are then placed on the production line. Thereafter, manufacturing of the seven lots of contact lenses is performed for many hours. Accordingly, once the lens mold carriers are placed on the production line it is only possible to manufacture the same seven lots of contact lenses during these many hours. In case each individual mounting location on the lens mold carrier represents an individual lot, then it is possible to manufacture fourteen different lots at the same time, this being the maximum number of lots that can be manufactured during these many hours.

This is an efficient manner to produce high numbers of contact lenses having a base curve radius selected from a certain range of base curve radii and having an optical power that is selected from a certain range of optical powers. For example, within the said certain range of base curve radii contact lenses are produced at steps of, for example, 0.1 millimeter (mm) difference in base curve radius. And for each individual base curve radius within the said range of base curve radii, contact lenses having optical powers within the said certain range of optical powers are produced at steps of, for example, 0.25 diopter (dpt) difference in optical power. For each such combination of base curve radius and optical power the market requires a high number of contact lenses, as there is a high number of contact lens wearers in the population requiring contact lenses having these combinations of base curve radii and optical powers. Accordingly, production of a high number of contact lenses through the above-described process is very efficient.

After the above-described manufacture of contact lenses has been performed for many hours, operation of the production line is interrupted and a line clearance is performed, i.e. the lens mold carriers are removed from the production line. New lens mold carriers which have been configured off-line and which may (or may not) be equipped with mold halves different from those that have been used before are then placed on the production line. A number of sample contact lenses must then be produced, and only after these sample contact lenses have been produced and inspected and have been found to have the required specifications, operation of the production line is resumed. This is a laborious and time-consuming process with very considerable downtime of the production line during which no contact lenses can be produced.

In case smaller lots of contact lenses having the same properties are required by the market (contact lenses having combinations of base curve radius and optical power for which only smaller numbers of contact lens wearers exist in the population) this process is open to improvement, since the downtime of the production line (i.e. the time during which the previous lens mold carriers are removed from the production line and during which the new lens mold carriers are placed on the production line) is very considerable. While downtime of the production line is generally unwanted it is to some extent acceptable for larger lots (i.e. high numbers of contact lenses to be produced, for example many thousands of contact lenses). However, downtime of the production line strongly affects efficiency in case smaller lots (for example only a few hundreds of contact lenses) are to be produced.

It is therefore an object of the invention to overcome the afore-mentioned disadvantages and to suggest an apparatus and method allowing for an efficient production also of smaller lots of lenses.

This object is achieved through a manufacturing module, through a production line comprising such manufacturing module, and through a method of producing ophthalmic lenses as they are specified by the features of the respective independent claim.

In particular, as regards the manufacturing module the object is achieved by a manufacturing module for the manufacture of ophthalmic lenses, in particular contact lenses such as soft contact lenses, comprising a plurality of manufacturing stations arranged in a closed loop and a plurality of lens mold carriers which are transported through the manufacturing stations arranged in the closed loop.

Each lens mold carrier comprises a frame having a predetermined number of mounting sites arranged at predetermined locations along the frame, the predetermined number and locations of the mounting sites being identical for each lens mold carrier of the plurality of lens mold carriers.

Each lens mold carrier further comprises a predetermined number of molds corresponding to the predetermined number of mounting sites of the frame, with the molds being removably mounted to the frame at the mounting sites, and with all molds of a said lens mold carrier either being reusable male molds or with all molds of the said lens mold carrier being reusable female molds.

Two lens mold carriers, respectively, of the plurality of lens mold carriers are assigned to each other to form a pair of lens mold carriers in a manner such that for each pair of lens mold carriers at the mounting sites of one lens mold carrier of a said pair reusable male molds are arranged, while at the mounting sites of the other lens mold carrier of the said pair reusable female molds are arranged, so that upon mating the two lens mold carriers of the said pair of lens mold carriers the respective reusable male and female molds are mated to form mold cavities defining the shape of the lenses to be manufactured.

The manufacturing stations comprise a mold changing station, the mold changing station being configured to be capable of removing a said mold from its mounting site on the frame of a said lens mold carrier and mounting a different mold to the frame at the said mounting site, or being configured to change the rotational position of a said mold mounted to the frame of a said lens mold carrier, or both.

According to one aspect of the manufacturing module according to the invention, the mold changing station comprises a male mold exchange station for removing a said male mold from its mounting site on the frame of a said lens mold carrier, and for mounting a different male mold to the said mounting site.

According to a further aspect of the manufacturing module according to the invention, the mold changing station comprises a female mold exchange station for removing a said female mold from its mounting site on the frame of a said lens mold carrier, and for mounting a different female mold to the said mounting site.

According to still a further aspect of the manufacturing module according to the invention, the mold changing station comprises a toric axis setting station for changing and setting the rotational position of a said male or female mold mounted to the lens mold carrier.

Yet in accordance with another aspect of the manufacturing module according to the invention, the manufacturing module is further configured to assign to each lens a unique lens identification code which is representative of the type of lens at least for a predetermined period of time.

In accordance with a further aspect of the manufacturing module according to the invention, the manufacturing module further comprises a printing station, wherein the printing station is configured to print the unique lens identification code to one of the reusable male and female molds.

According to a further aspect of the manufacturing module according to claim the invention, the printing station is an inkjet printing station.

According to still a further aspect of the manufacturing module according to the invention, the manufacturing stations are grouped to form a plurality of individual manufacturing units arranged in a closed loop, with the individual manufacturing units of the plurality of individual manufacturing units comprising a plurality of the manufacturing stations. The manufacturing module further comprises a plurality of transfer robots, each transfer robot of the plurality of transfer robots being arranged at a location between two individual manufacturing units of the plurality of individual manufacturing modules and being configured to transfer the lens mold carriers from one of the two individual manufacturing units between which the respective transfer robot is arranged to the other one of the individual manufacturing units between which the respective transfer robot is arranged.

According to yet a further aspect of the manufacturing module according to the invention,
- a first individual manufacturing unit of the plurality of manufacturing units comprises the male mold exchange station, the female mold exchange station, and the toric axis setting station,
- a second individual manufacturing unit of the plurality of manufacturing units comprises a dosing station for dosing a lens forming material into the male or female molds, a closing station for mating the assigned pairs of lens mold carriers, and a forming station for moving the individual molds formed by the mated lens mold carriers to an intermediate closed position,
- a third individual manufacturing unit comprises a curing station for curing the lens forming material to form lenses, in particular a UV-light station, and a relative mold movement station configured to perform a relative movement of the male and female molds from the intermediate closed position to a final closed position during curing of the lens forming material,
- a fourth individual manufacturing unit comprises a mold opening station for separating the assigned pairs of lens mold carriers, a rinsing station for rinsing away any excess lens material from the molds, and a removal station for removing the lenses from the molds and for transporting them away from the manufacturing module, and
- a fifth individual manufacturing unit comprises a mold cleaning station, a mold rinsing station, and a mold drying station.

In accordance with a further aspect of the manufacturing module according to the invention, the inkjet printing station is arranged between the first individual manufacturing unit and the second individual manufacturing unit.

Another aspect of the invention is directed to a production line for the production of ophthalmic lenses, in particular contact lenses such as soft contact lenses. The production line comprises a manufacturing module as described above, and further comprises an extraction and treatment module for the extraction of unwanted substances from the lenses and for chemical treatment of the lenses, an inspection module for the inspection of the extracted and chemically treated lenses, and a packaging module for packaging the lenses that have been identified by the inspection module as being acceptable.

Still another aspect of the invention is directed to a method of producing ophthalmic lenses, in particular contact lenses such as soft contact lenses, the method comprising manufacturing a plurality of lenses in a closed-loop manufacturing process in which different lots of lenses are simultaneously manufactured in a manufacturing module as described above.

The method comprises the steps of:
- dispensing a lens forming material into the female molds of one lens mold carrier of the respective pair of lens mold carriers or into the male molds of the other lens mold carrier of the respective pair of lens mold carriers,
- mating the two lens mold carriers of the respective pair of lens mold carriers to form the mold cavities with the lens forming material being enclosed in the mold cavities formed between the male and female molds,
- curing the lens forming material in the mold cavities to form the ophthalmic lenses,
- separating the two mated lens mold carriers of the respective pair of lens mold carriers,
- removing the ophthalmic lenses from the male or female molds,
- in the mold changing station, removing at least one mold from its mounting site on one of the two lens mold carriers of the respective pair of lens mold carriers and mounting a different mold to the said mounting site, or changing the rotational position of at least one of the molds mounted to the two lens mold carriers of the respective pair of lens mold carriers, or both.

According to one aspect of the method according to the invention, in the mold changing station a said male mold is removed from its mounting site on the lens mold carrier and a different male mold is mounted to the said mounting site.

According to a further aspect of the method according to the invention, in the mold changing station a said female mold is removed from its mounting site on the lens mold carrier and a different female mold is mounted to the said mounting site.

In accordance with yet another aspect of the method according to the invention, in the mold changing station the rotational position of a said male or female mold is changed while the said male or female mold remains mounted to the lens mold carrier.

The mold changing station of the manufacturing module allows for a mold exchange, i.e. it allows for a removal of a mold from its mounting site on the frame and for mounting of a different mold to the frame at the said mounting site, while the lens mold carrier remains on the production line. A different mold in this regard is to be understood such that it is different in at least one geometrical property (for example the base curve radius or the front curve radius, depending on whether it is a male mold or a female mold). A line clearance, i.e. a complete interruption of the production line, removal of all lens mold carriers from the production line in order to be able to subsequently place new lens mold carriers on the production line carrying different molds, and the subsequent production of sample lenses etc., is no longer required to perform the change. Since the mold exchange station is one of the stations of the manufacturing module which are arranged in the closed loop, it is possible to perform the exchange of the mold while production keeps on running. It is thus possible to start production of a new lot of contact lenses without the need to interrupt production ("lot change on the fly"), thus leading to a high increase in flexibility and production efficiency.

Only by way of example, let us assume that the above-described lens mold carriers are used, with each carrier comprising the frame having the fourteen mounting sites, and that for each of the lens mold carriers transported through the manufacturing stations of the manufacturing module at the same mounting site the same type of mold (i.e. male or female) is mounted to the frame (and this includes that fourteen different molds may be mounted to each mold carrier, but the arrangement of the molds is the same for all mold carriers). If a lot change is to be performed, in the mold changing station the mold mounted to the frame of the respective lens mold carrier at let us say mounting site number one is removed from the frame of the respective lens mold carrier and a new mold is mounted to the frame at the said mounting site number one instead. Once the next lens mold carrier enters the mold changing station, the same exchange operation is performed at mounting site number one of the next lens mold carrier, and so on, until the molds at mounting site number one of all lens mold carriers transported through the manufacturing module have been exchanged (although for lots smaller than the total number of lens mold carriers transported through the manufacturing module even that is not necessary). The lot change is then completed. Production of the new lot of lenses already starts once the first lens mold carrier having the new mold mounted to the carrier at mounting site number one reaches a dosing station arranged downstream of the mold changing station where a lens forming material is dosed into the mold. Since all subsequent lens mold carriers reaching the dosing station have the same new mold arranged at mounting site number one, too, production of the new lot of lenses is continued until the next mold exchange is performed at mounting site number one.

It goes without saying that the mold exchange described above at mounting site number one of a lens mold carrier has been described by way of example only. It is of course also possible to change the molds at any other mounting site of the lens mold carrier. Also, it is possible to exchange the molds at different mounting sites of a lens mold carrier at the same time, for example it is possible to exchange the molds at mounting sites number one and three at the same time. It is even possible to exchange the molds at each of the fourteen mounting locations at the same time, meaning that production of fourteen new lots of lenses is started at the same time. In the extreme, it is possible to produce lots each consisting of one single lens only (meaning that all molds at each of the mounting sites are always exchanged in the mold exchange station), so that in the extreme the maximum number of lots concurrently manufactured corresponds to the number of lens mold carriers times the number of mounting sites per lens mold carrier.

Alternatively, instead of performing a lot change on the fly in the mold changing station by exchanging a mold (i.e. by removing a mold from the frame at a particular mounting site and mounting a new mold at the said particular mounting site), it is also possible to perform a lot change on the fly by changing the rotational position of the mold (in case the mold is not rotationally symmetrical as this is the case e.g. in the production of toric lenses). Change of the rotational position of the mold means, that the mold is not removed from its mounting site on the frame of the lens mold carrier but that the mold is only rotated while it remains mounted to the frame of the lens mold carrier.

And although the mold is not exchanged, due to the mold not being rotationally symmetrical a new lot of lenses is produced after rotation of the mold. This can be easily understood when glancing at toric lenses. For toric lenses, the two main axes of the toric lenses are typically arranged perpendicular relative to each other. If this arrangement of the two main axes is angularly rotated (by rotating the mold) a different toric lens is produced as the arrangement of the two main axes is different after rotation (new toric axis setting), assuming that the other mold is not rotated. Also, it is again possible to change the toric axis setting of two or more molds at different mounting sites at the same time, similar to what is discussed above with reference to the mold exchange.

Of course, combinations of mold exchange and changes in rotational position (toric axis setting) can be performed, i.e. a new mold may be mounted to the frame at a particular mounting site with the toric axis setting being different from the toric axis setting of the mold that has been exchanged. Also, this can be performed at different mounting sites of the lens mold carrier at the same time.

As is evident, a lot change on the fly can be performed either by exchanging a male mold in a male mold exchange station, or by exchanging a female mold in a female mold exchange station, or both. Toric axis setting (i.e. rotation of the male or female mold) can be performed in a toric axis setting station.

Assigning a unique lens identification code to each lens of the same type (e.g. the same optical power, the same base curve and front curve radii, etc.), for example by printing a unique lens identification code to one of the reusable male and female molds using an inkjet printer so that the code will be transferred and become part of the lens as the lens forming material is cured to form the lens, allows for checking in an inspection module (by reading the unique lens identification code) whether the lens inspected actually is of the type represented by the respective unique lens identification code. In addition, it allows for checking whether the lens actually inspected is that lens which is expected to be inspected at the respective time (i.e. whether the lens actually inspected is the correct lens in the sequence of lenses manufactured).

The lens identification code may be unique and is representative of the type of contact lens during this predetermined period of time. By way of example, the duration of such predetermined period of time may be from one week to three months. This means, that during this predetermined period of time the same lens identification code cannot be used for a different type of contact lens, however, after that predetermined period of time is over, the same lens identification code can be used again, even for a different type of contact lens. If the same lens identification code is used again, it is again unique and representative for this different type of contact lens for the next predetermined period of time.

Alternatively, the lens identification code may be unique and is representative for the type of contact lens not only for a predetermined period of time, but may be representative for this type of contact lens independent of time. This means that each unique lens identification code is representative of one type of contact lens only. Accordingly, a different type of contact lens then mandatorily must have a different unique lens identification code.

As an entire manufacturing module typically comprises quite a number of individual manufacturing stations, some of these manufacturing stations may be grouped together to form individual manufacturing units, with each of these individual manufacturing units comprising a plurality of manufacturing stations. The manufacturing module also comprises a plurality of transfer robots which are arranged such that between every two such subsequent individual manufacturing units a transfer robot is arranged to transfer the lens mold carriers from a preceding manufacturing unit to a subsequent manufacturing unit. Thus, in one such individual manufacturing unit a plurality of manufacturing steps/operations can be performed, and only once these manufacturing steps/operations have been completed the transfer robot picks the lens mold carrier and transfers it to the subsequent manufacturing unit. Such sub-modular construction of the manufacturing module itself allows for adding or removing additional manufacturing stations or units to an already existing manufacturing module, as for a change to the manufacturing module it is then only required to add or remove a manufacturing station/unit and possibly add/remove a transfer robot, and to configure/program the transfer robots in a manner such that the lens mold carriers are correctly transferred to the desired next manufacturing station/unit.

For example, in one embodiment of the manufacturing module, a first manufacturing unit comprises the male mold exchange station, the female mold exchange station, and the toric axis setting station. In this first manufacturing unit it is determined whether or not a lot change is performed by either replacing a male mold or a female mold, by rotating a mold, or by a combination thereof. A second manufacturing unit comprises a dosing station for dosing a lens forming material into the male or female molds (typically into the female molds), a closing station for mating the assigned pairs of lens mold carriers (and of the molds mounted to these lens mold carriers) and a forming station for moving the individual molds formed by the mated lens mold carriers to an intermediate closed position. This second manufacturing unit comprises manufacturing stations in which the molds are prepared for the subsequent curing of a lens. A third manufacturing unit comprises a curing station (in particular a UV-light station) for curing the lens forming material to form lenses and a relative mold movement station configured to perform a relative movement of the male and female molds from the intermediate closed position to a final closed position during curing of the lens forming material. As is known, during curing the lens forming material with the aid of UV-light in a comparatively short period of time (for example, within a range of some seconds up to some twenty or some thirty seconds) the lens forming material shrinks to a non-negligible extent. At the same time, the relative mold movement station moves the male and female molds relative to one another from the intermediate closed position (into which the male and female molds have been moved already in the forming station of the second manufacturing unit) to a final closed position in which the cavity formed between the male and female molds corresponds to the desired shape of the lens. As is evident, the third manufacturing unit comprises manufacturing stations in which a lens is formed by curing the lens forming material. A fourth manufacturing unit comprises a mold opening station, a rinsing station for rinsing away any excess material, and a removal station for removing the lenses from the molds and for transporting them away from the manufacturing module. Obviously, this fourth manufacturing unit comprises manufacturing stations dealing with the opening and removal of the already cured lens from the manufacturing module. As far as the lens manufacturing process is concerned, the lens manufacturing process is then completed and the lens may be transported away for further treatment (e.g. chemical treatment), if necessary, or for inspection and subsequent packaging if no lens treatment is necessary. Finally, a fifth manufacturing unit comprises a mold cleaning station a mold rinsing station, and a mold drying station. In the mold cleaning station any excess material is removed from the molds while in the rinsing station a final rinse of the molds is performed before the molds are dried in the mold drying station (e.g. with the aid of drying air having a well-defined humidity). Thereafter, the reusable molds are ready again for being used in the next production cycle and may be either routinely transported to the first manufacturing unit again where a lot change on the fly may or may not be performed, or the reusable molds may be directly transported to the second manufacturing unit (i.e. skip the first manufacturing unit) or to the ink jet printing unit in case no lot change is to be performed. This inkjet printing unit is preferably arranged between the first manufacturing unit and the second manufacturing unit.

As regards the complete production line, in addition to the manufacturing module such production line may comprise and extraction and treatment module in which any unwanted substances, for example non-polymerized and/or non-cross-linked lens forming material and/or solvents, can be extracted from the lenses. Also, the lens can be otherwise chemically treated in the said extraction and treatment module. For example, a coating can be applied to the lens. Still further, the production line may comprise an inspection module in which the extracted and/or chemically treated lenses can be inspected. Inspection of the lenses may include an inspection of the lenses for cosmetic defects such as inclusions, bubbles, tears, edge defects, etc., and may also include a determination of the optical properties (corrective power, etc.) of the lenses as well as a determination of the center thickness of the lenses. Still further, the production line may include a packaging module for automatically packaging those lenses that have been identified by the inspection module as being acceptable, so that the entire production of the lenses—from the manufacture of the lenses to the (primary) packaging of the lenses—can be performed completely automatically.

Regarding the method for producing the ophthalmic lenses using the manufacturing module, the lot change on the fly is performed in the mold changing station by either removing at least one mold from its mounting site on the lens mold carrier and mounting a different mold to the said mounting site, or by changing the rotational position of at least one of the molds. This can be performed by removing a male mold from its mounting site and by mounting to the said mounting site a different male mold, or by removing from its mounting site a female mold and by mounting a different female mold to the said mounting site, or both. Alternatively or in addition, it is possible to change the rotational position of the mold while the mold remains mounted to the lens mold carrier.

Further advantageous aspects will become apparent from the following description of embodiments of the invention with the aid of the drawings in which:

FIG. 8 shows a perspective view from above of the mold unit shown in FIG. 7;

FIG. 9 shows a perspective view from below of the mold unit shown in FIG. 7;

Figure 1:
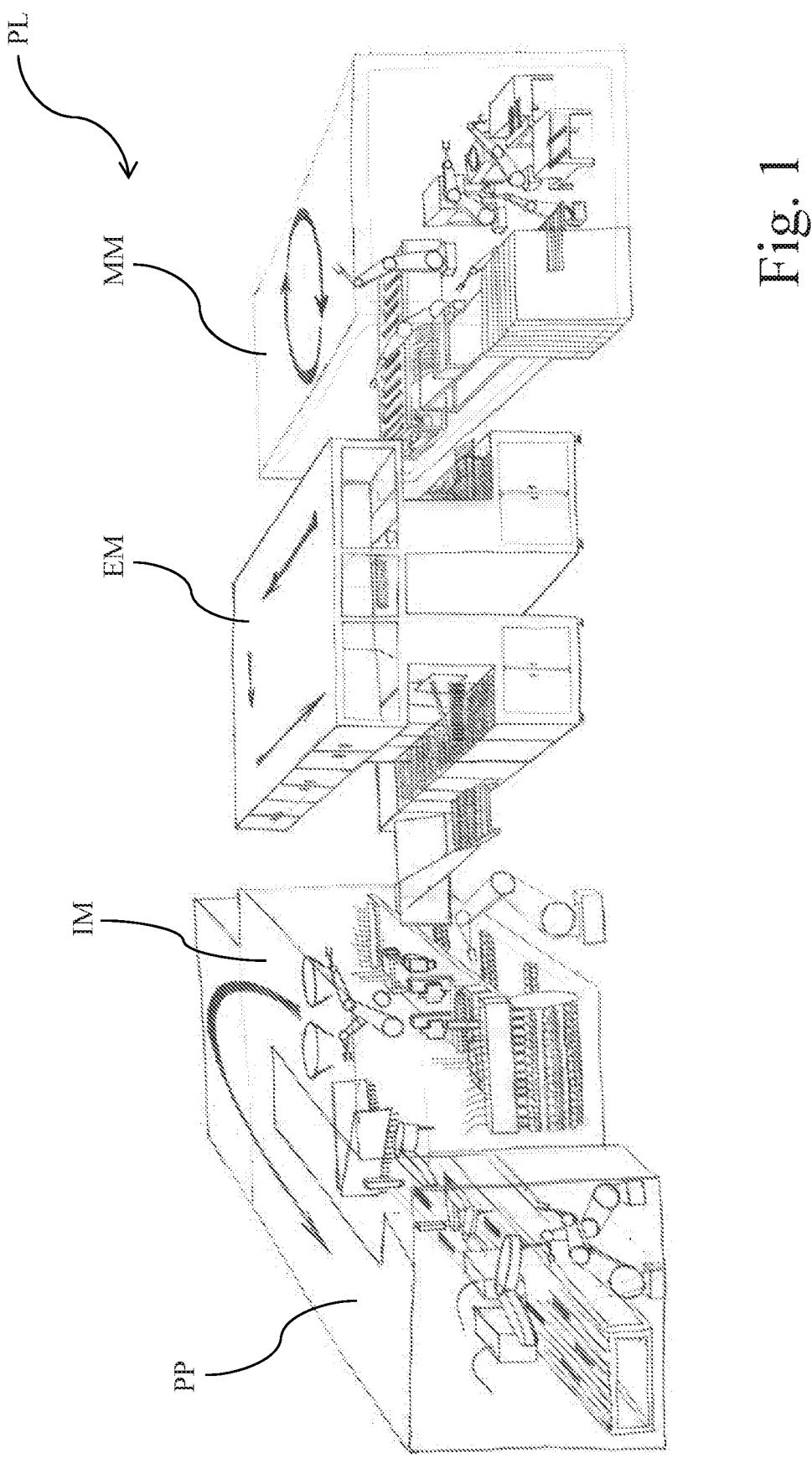
FIG. 1 shows an embodiment of a production line according to the invention, comprising a manufacturing module according to the invention, an extraction and treatment module, an inspection module, and a packaging module.

In FIG. 1 an embodiment of a production line PL according to the invention for the production of contact lenses, for example soft contact lenses made of a silicone hydrogel material, is shown. Production line PL comprises a manufacturing module MM, an extraction and treatment module EM (in the following referred to as "extraction module" only for the sake of simplicity), an inspection module IM, and a packaging module PP for the primary packaging of the contact lenses. The interfaces between the individual modules MM, EM, IM and PP of production line PL, i.e. the locations where the contact lenses are transferred from a preceding module to a subsequent module, are arranged at fixed locations so that in case changes are performed within one or more of the individual modules MM, EM, IM and PP this does not affect the general architecture of the production line. Such changes in the individual modules may be caused by process changes, for example when new contact lenses are produced using a different lens forming material. By the modular architecture of the production line PL, the flexibility of the production line is increase significantly, facilitating the introduction and production of new contact lenses. In such case, the change is performed in the respective individual module while the general architecture of the production line including the locations of the interfaces remains unchanged.

In the manufacturing module MM, the manufacture of the contact lenses is performed. The manufactured contact lenses are subsequently transferred from the manufacturing module MM to the extraction module EM where unwanted substances, for example non-polymerized and/or non-cross-linked lens forming material or solvents, are extracted from the contact lenses, and where the contact lenses may be further chemically treated. For example, a coating may be applied to the extracted contact lenses in order to increase their lubricity. The extracted and chemically treated contact lenses are subsequently transferred from the extraction module EM to the inspection module IM, where the contact lens is inspected as to whether it is acceptable for being packaged and distributed to customers. Once the contact lenses have been determined by the inspection module IM as being acceptable, they are transferred from the inspection module IM to the (primary) packaging module PP. Contact lenses which are determined by the inspection module IM as not being acceptable are disposed of. The acceptable contact lenses transferred to the (primary) packaging module PP are packaged in primary packages. The primary packages containing the contact lenses leaving the packaging module PP are then placed in an autoclave, and once autoclaved they are forwarded for secondary packaging.

As is already indicated in FIG. 1 schematically by the arrows and as is discussed in more detail further below, the manufacturing module MM comprises a plurality of manufacturing stations which are arranged in a closed loop, and one of these manufacturing stations is part of the interface between the manufacturing module MM and the extraction module EM where the manufactured contact lenses are transferred from the manufacturing module MM to the extraction module EM.

Figure 6:
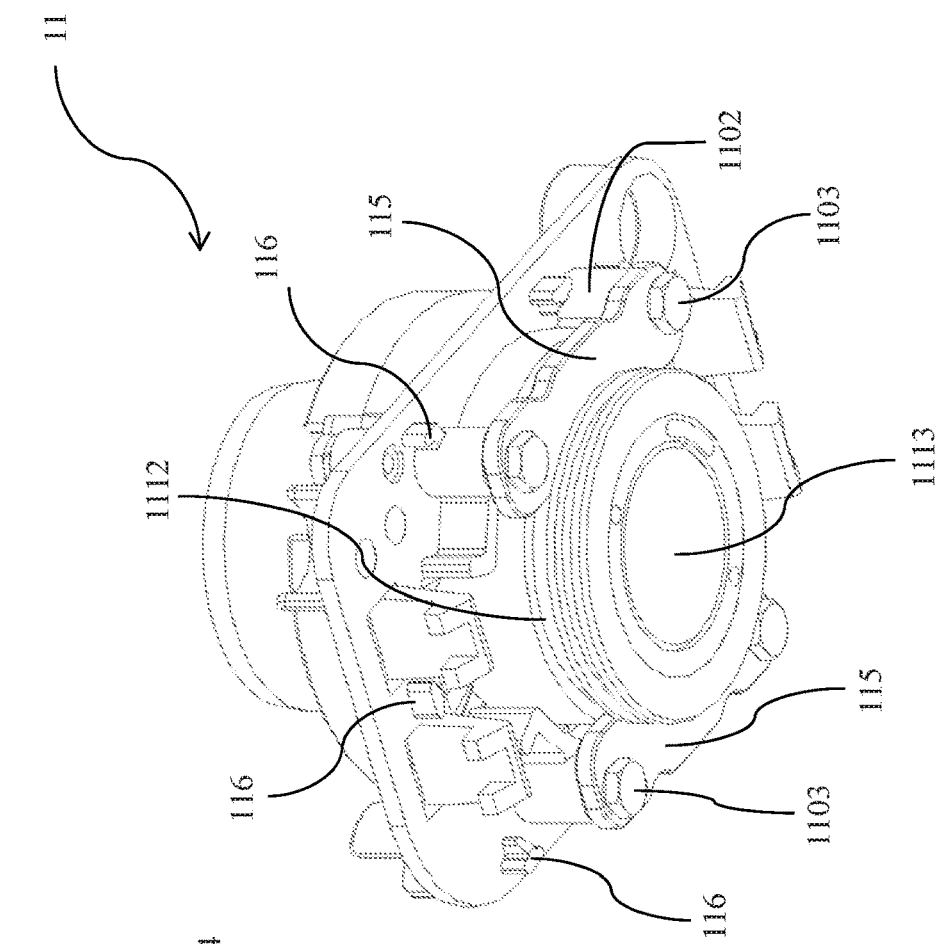
FIG. 6 shows a perspective view from below of the mold unit shown in FIG. 4.

By way of example, in the embodiments described the molds are arranged in mold units as will become apparent from the description below (although in general the mold can either be directly mounted to the lens mold carrier or in a manner other than through the mold unit). In the manufacturing module MM, a plurality of lens mold carriers are transported through the individual manufacturing stations. The lens mold carriers may be embodied in the manner shown in WO 2015/078798. One embodiment of such a lens mold carrier 1 (comprising female mold units) is described in the following with the aid of FIG. 4, FIG. 5 and FIG. 6.

Lens mold carrier 1 comprises a frame 10 which extends in a plane and comprises a plurality of individual compartments 100. Each of the compartments 100 is bounded by compartment walls 101, 102, 103, 104. In addition, in each compartment 100 there is an angled wall portion 105 arranged in one of the corners of the respective compartment 100.

Figure 4:
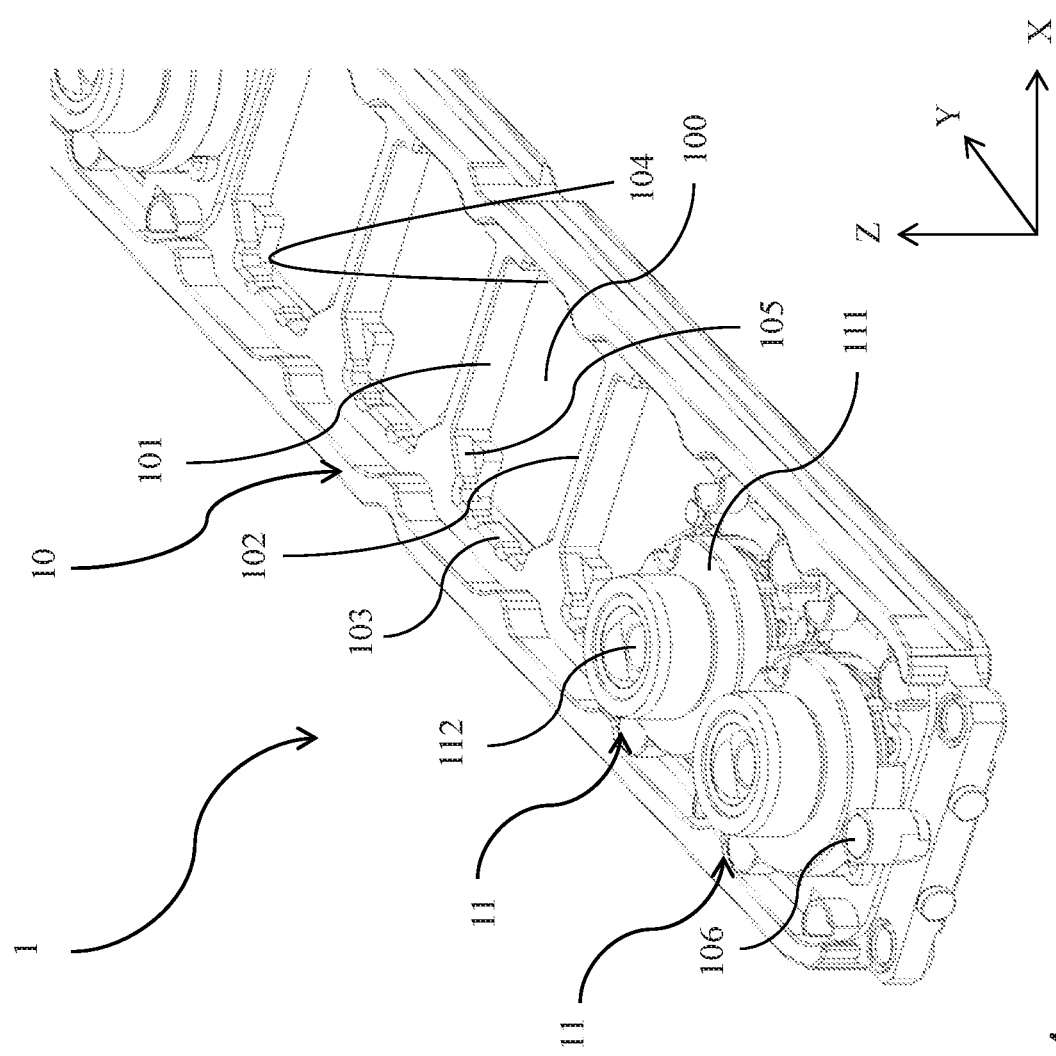
FIG. 4 shows a perspective view of a lens mold carrier including two mold units comprising female molds which are arranged at their mounting positions in compartments of a frame of the lens mold carrier.

As is shown in FIG. 4, in each of the two foremost compartments 100 of frame 10 a female mold unit 11 is arranged. Female mold unit 11 comprises an adapter piece 110 (see FIG. 5) preferably made of a thermoplastic material, and a sleeve 111. A female lens mold 112 is fixedly arranged in sleeve 111 which itself is fixedly arranged in adapter piece 110.

Sleeve 111 has a generally cylindrical shape. At its front end sleeve 111 extends over female lens mold 112, and this front end of sleeve 111 comprises a chamfered portion 1110 for engaging with a corresponding rounded front portion of the sleeve of a male mold unit (see further below) in order to facilitate mating of the male and female mold units. Sleeve 111 further comprises a recess 1111 into which a fixation bracket 114 engages. Fixation bracket 114 is fixedly mounted to a post 1100 projecting from the front face of adapter piece 110 with the aid of a screw 1101 and secures sleeve 111 against rotation.

Sleeve 111 comprises two or more circumferentially running grooves 1112. Two fixation brackets 115 (see FIG. 6) engage into one of the circumferentially running grooves 1112 at opposite sides. At its back end, sleeve 111 is provided with a centrally arranged glass disk 1113, as this is well-known in the art.

Adapter piece 110 further comprises a mold identifier 1104 comprising a transponder which is arranged in a stub projecting from the front face of adapter piece 110. The transponder comprises an RFID which can be read automatically and which contains information allowing to identify the female mold 112 of the respective female mold unit 11. Adapter piece 110 further comprises three stubs 1105 projecting from the front face of adapter piece 110. These stubs 1105 have the same height as the stub of mold identifier 1104.

Figure 5:
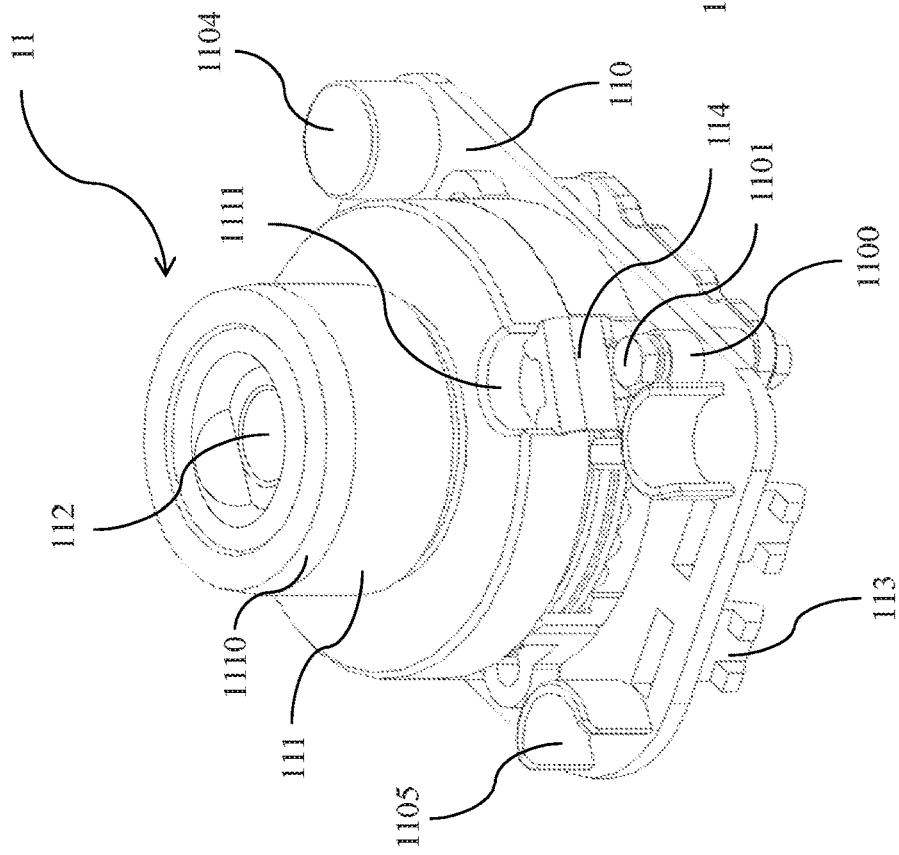
FIG. 5 shows a perspective view from above of the mold unit shown in FIG. 4.

Adapter piece 110 further comprises two pairs of resilient latches 113 (see FIG. 5). In order to securely mount female mold unit 11 to one of the compartments 100 of frame 10, female mold unit 11 is pressed from above into compartment 100 until the resilient latches 113 of adapter piece 110 snap beneath and engage the compartment walls 103, 104 of frame 10. Once this engagement has occurred, female mold unit 11 is floatingly arranged in the respective compartment 100 of frame 10. Since female mold unit 11 is floatingly arranged in compartment 100, limited movement of the adapter piece 110 is possible within compartment 100 both in a translation plane (a plane parallel to or coincident with the plane of the lens mold carrier, i.e. in x,y-direction) as well as in a direction perpendicular thereto (z-direction).

On the other hand, female mold unit 11 is securely connected to frame 10 allowing for handling and transfer of the female mold unit 11 (including female mold 112) in the manufacturing module.

As is evident, the movement of adapter piece 110 (and thus of female mold unit 11) within compartment 100 in z-direction is limited by the resilient latches 113. Movement of the adapter piece 110 in the translation plane is limited by six abutment posts 116 arranged on the rear face of adapter piece 110 and projecting therefrom, with one of the abutment posts 116 being arranged in a specific manner to allow for mounting of adapter piece 110 to the frame 10 in the respective compartment 100 only in one orientation (the correct orientation). The limited movement of adapter piece 110 within compartment 100 in the translation plane may amount up to 0.3 mm in the x-direction and up to 0.3 mm in the y-direction (in each of the positive and negative x- or y-direction, respectively; i.e. ±0.3 mm).

As can be seen from FIG. 4, frame 10 is provided with a carrier identifier 106 comprising a transponder which is arranged in a stub projecting from the front face of frame 10. The transponder comprises an RFID which can be read automatically and which contains information allowing to identify the respective lens mold carrier 1 as well as information allowing to identify which female mold 112 is arranged in which compartment 100 of the frame 10 of lens mold carrier 1. With the aid of the carrier identifier 106 and the mold identifier 1104 it is always possible to identify at any time at any desired location in the manufacturing line which mold is arranged in which compartment of which lens mold carrier. This allows for an association of the lens mold to the respective contact lenses produced with that lens mold which may be advantageous, for example, for quality monitoring and tracking purposes.

For further details of lens mold carrier 1 it is referred to the description of the afore-mentioned WO 2015/078798.

A further embodiment of such lens mold carrier, also described in detail in WO 2015/078798 is described in the following with the aid of FIG. 7, FIG. 8, FIG. 9 and FIG. 10 (an embodiment comprising male mold units). Many details of this further embodiment of the lens mold carrier 2 and of its components are similar to those of the first embodiment of the lens mold carrier 1, so that not each and every detail is explained again. As a general rule, the leading numeral "1" of the reference signs used for the embodiment of the lens mold carrier described above is replaced with the leading numeral "2" in the further embodiment of the lens mold carrier described below.

Accordingly, lens mold carrier 2 comprises a frame 20 which extends in a plane and comprises a plurality of individual compartments 200. Each of the compartments 200 is bounded by compartment walls 201, 202, 203, 204. In addition, in each compartment 200 there is an angled wall portion 205 arranged in one of the corners of the respective compartment 200.

Figure 7:
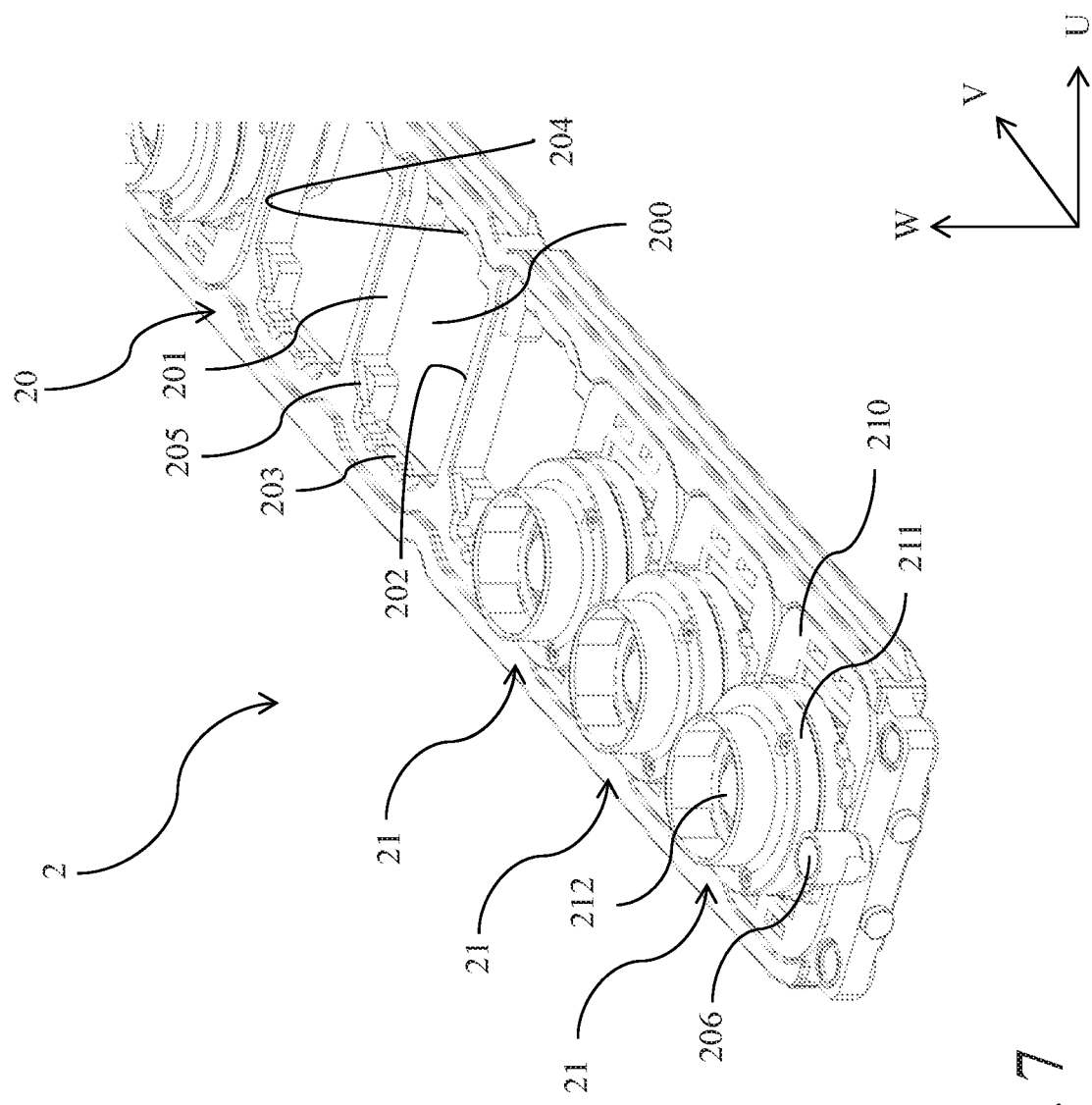
FIG. 7 shows a perspective view of a lens mold carrier including three mold units comprising male molds which are arranged at their mounting positions in compartments of a frame of the lens mold carrier.
Figure 10:
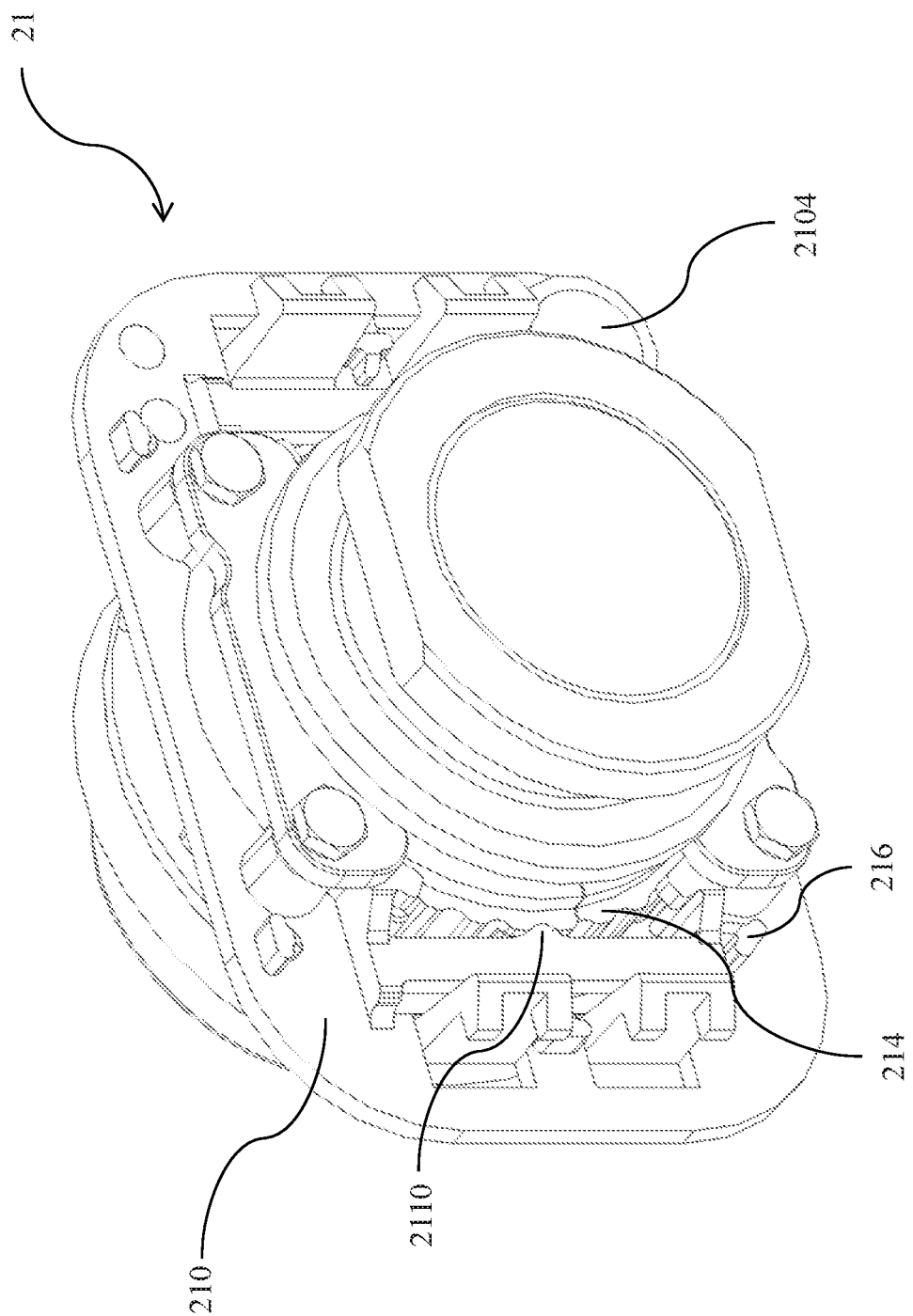
FIG. 10 shows the mold unit of FIG. 9 and the adjusting ring lockingly connected to the adapter piece of the mold unit.

As is shown in FIG. 7, in each of the three foremost compartments 200 of frame 20 a male mold unit 21 is arranged. Male mold unit 21 comprises an adapter piece 210, preferably made of a thermoplastic material, and a sleeve 211. A male lens mold 212 is fixedly arranged in sleeve 211. Sleeve 211 is arranged in a central opening of adapter piece 210 and is lockingly connected to the adapter piece 210 at a fixed angular position, but can be rotated relative to adapter piece 210 to get lockingly connected to the adapter piece 210 at another fixed angular position, as will be explained in more detail below.

Sleeve 211 has a generally cylindrical shape (see FIG. 8). At its front end sleeve 211 extends over male lens mold 212, and this front end of sleeve 211 of male mold unit 21 comprises a rounded portion 2110 for engaging with the chamfered portion 1110 of sleeve 111 of the female mold unit 11 (see FIG. 5) in order to facilitate mating of the male and female mold units. Sleeve 211 comprises two circumferentially running grooves 2112. A toothed adjusting ring 214 (see FIG. 8, FIG. 10) comprising two assembled ring pieces is arranged in one of these grooves 2112 (see FIG. 9) as well as two fixation brackets 215 which engage into the same groove 2112 at opposite sides. Adjusting ring 214 is firmly attached to sleeve 211 so that it can be rotated only together with sleeve 211 relative to adapter piece 210 in a plane parallel to the plane of the lens mold carrier 2 (u-v plane). However, rotation of adjusting ring 214 is only possible between fixed angular positions, at which the toothed adjusting ring 214 lockingly engages with two fixedly arranged locking teeth 2110 which are provided on locking elements that form part of the adapter piece 210 (see FIG. 10), these two locking teeth 2110 being arranged at opposite sides. Thus, adjusting ring 214 is lockingly connected to the adapter piece 210 at fixed angular positions. This is advantageous in the production of toric contact lenses since it allows, with the aid of a handling system, to automatically change the angular position of the axes of (toric) male mold 212 by rotating adjusting ring 214 (and together with it male mold unit 21 including male mold 212) by one or more fixed angular increments relative to adapter piece 210, and to then have it lockingly connected with adapter piece 210 again at a different angular position, so that a toric contact lens with a different arrangement of the axes can be produced. At its back end, sleeve 211 is provided with a centrally arranged glass disk 2113 allowing UV-light to pass through to the mold for curing the lens forming material, as this is well-known in the art.

Adapter piece 210 further comprises a mold identifier 2104 comprising a transponder which is arranged in a stub projecting from the rear face of adapter piece 210. The transponder comprises an RFID which can be read automatically and which contains information allowing to identify the male mold 212 of the respective male mold unit 21.

Adapter piece 210 further comprises two pairs of resilient latches 213. In order to securely mount male mold unit 21 to the frame 20 in one of the compartments 200, male mold unit 21 is pressed from above into compartment 200 until the resilient latches 213 of adapter piece 210 snap beneath and engage the compartment walls 203, 204 of frame 20. Once this engagement has occurred, male mold unit 21 is floatingly arranged in the respective compartment 200. Since male mold unit 21 is floatingly arranged in compartment 200, limited movement of the adapter piece 210 is possible within compartment 200 both in a translation plane (which is a plane parallel to or coincident with the u-v plane) as well as in a direction perpendicular thereto (w-direction). On the other hand, male mold unit 21 is securely connected to frame 20 allowing for handling and transfer of the male mold unit 21 (including male mold 212) in the manufacturing module.

As is evident, the movement of adapter piece 210 (and thus of male mold unit 21) within compartment 200 in w-direction is limited by the resilient latches 213. Movement of the adapter piece 210 in the translation plane is limited by six abutment posts 2106 arranged on the rear face of adapter piece 210 and projecting therefrom, with one of the abutment posts 2106—that one in the lower left corner in FIG. 10—being arranged in a specific manner to allow for mounting of adapter piece 210 to the frame 20 in the respective compartment 200 only in one orientation (the correct orientation). The limited movement of adapter piece 210 within compartment 200 in the translation plane may amount up to 0.3 mm in the u-direction and up to 0.3 mm in the v-direction (in each of the positive and negative u- or v-direction, respectively; i.e. ±0.3 mm).

As can be seen from FIG. 7, frame 20 is provided with a carrier identifier 206 comprising a transponder which is arranged in a stub projecting from the front face of frame 20. The transponder comprises an RFID which can be read automatically and which contains information allowing to identify the respective lens mold carrier 2 as well as information allowing to identify which male mold 212 is arranged in which compartment 200 of the frame 20 of lens mold carrier 2. With the aid of the carrier identifier 206 and the mold identifier 2104 it is always possible to identify at any time at any desired location in the manufacturing line which mold is arranged in which compartment of which lens mold carrier. This allows for an association of the lens mold to the respective contact lenses produced with that lens mold which may be advantageous, for example, for quality monitoring and tracking purposes.

For further details of lens mold carrier 2 it is referred to the description of the afore-mentioned WO 2015/078798. The embodiment of lens mold carrier 1 and the embodiment of lens mold carrier 2 described above can be used in the manufacturing module of the production line PL according to the invention, an embodiment of which is already described with respect to FIG. 1.

Figure 2:
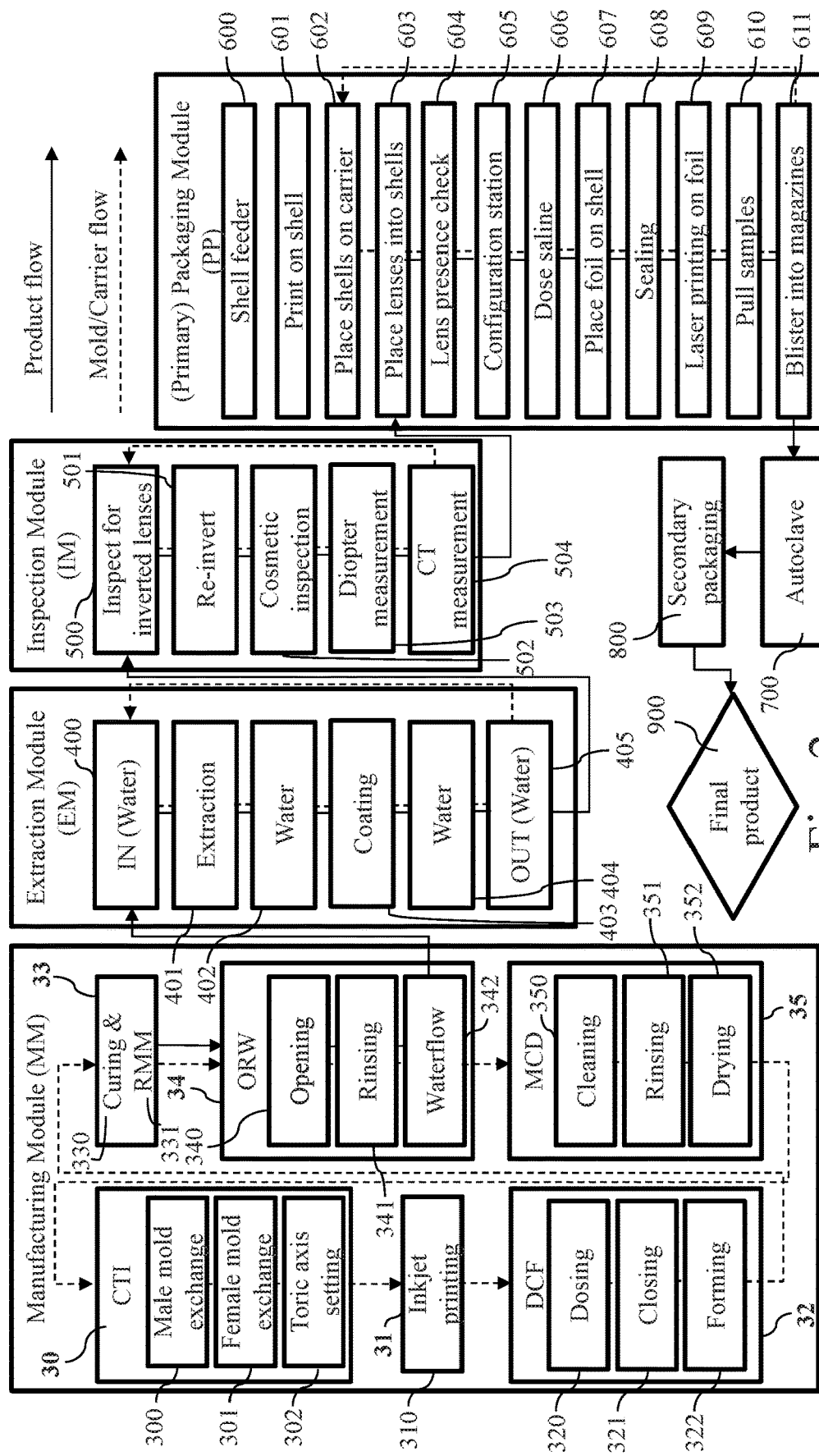
FIG. 2 shows a diagrammatic representation of an embodiment of the production line showing the individual stations.

In FIG. 2 a diagrammatic representation of an embodiment of the production line PL is shown showing the individual stations of the manufacturing module MM, the extraction module EM, the inspection module IM, and the (primary) packaging module PP.

In the manufacturing module MM, individual manufacturing stations are grouped together to form a plurality of individual manufacturing units, as is discussed below in more detail. A first manufacturing unit 30 labelled "CTI" comprises a male mold exchange station 300, a female mold exchange station 301 and a toric axis setting station 302.

In the male mold exchange station 300, in order to effect a lot change on the fly, for example at mounting site number one (corresponding to the foremost compartment 200 of lens mold carrier 2), it is possible to remove a male mold unit 21 from the foremost compartment 200 of lens mold carrier 2 and to mount a different male mold unit into the said foremost compartment 200 from which the male mold unit 21 has been removed. Alternatively, in the female mold exchange station 301, in order to effect a lot change on the fly, for example at mounting site number one (corresponding to the foremost compartment 100 of lens mold carrier 1), it is possible to remove a female mold unit 11 from the foremost compartment 100 of lens mold carrier 1 and to mount a different female mold unit to the said compartment 100. Of course, it is also possible to remove both the male mold unit 21 and the female mold unit 11 from the respective foremost compartment of the respective lens mold carrier to effect a lot change on the fly at mounting position number one. Further alternatively, in order to effect a lot change on the fly by producing a different toric contact lens, in the toric axis setting station 302 it is possible to rotate adjusting ring 214 (and together with it the male mold 212) by one or more fixed angular increments relative to adapter piece 210, and to then have it lockingly connected with adapter piece 210 again at a different angular position, so that a toric contact lens with a different arrangement of the axes can be produced. The first manufacturing unit labelled "CTI" will be explained in more detail further below.

Lens mold carrier 1 and lens mold carrier 2 are then transferred from manufacturing unit 30 ("CTI") to the next manufacturing station.

The next manufacturing station in the embodiment of the manufacturing module MM of the production line PL is an inkjet printing station 310. In the inkjet printing station, a unique lens identification code, for example a unique code of ink dots or any other suitable type of code is printed onto a mold, e.g. onto the female mold. The code is representative of the characteristics of the contact lens to be produced. This unique lens identification code is applied in each subsequent production cycle to the mold surface.

The ink dots printed on the mold are later transferred to the material forming the contact lens, for example they are embedded into the material forming the contact lens. The information contained in the unique lens identification code may comprise the following information (without being exhaustive): Lens material, base curve radius, optical corrective power, etc.

It is also possible that some or all of the coded information is provided on the contact lens through embossing, that is to say, one or both of the molds may have projections in a non-optical peripheral portion of the mold or molds which may produce corresponding embossments in the contact lens in a non-optical peripheral portion of the contact lens. Also combinations of embossing and inkjet printing are possible.

It is to be noted that the inkjet printing station 310 is optional only as the code can be provided in a different manner. Also, in general it is not mandatory that a code be provided on the contact lens, as the system control (not shown) of the production line PL always knows what type of mold is on each mounting position of each lens mold carrier on the production line PL.

Lens mold carrier 1 and lens mold carrier 2 are then transferred from to a second manufacturing unit 32.

Second manufacturing unit 32 labelled "DCF" comprises a dosing station 320, a closing station 321 and a forming station. In the dosing station 320 a predetermined quantity of lens forming material is dispensed (dosed) into the female molds 112 of the female mold units 11 of lens mold carrier 1. Thereafter, in the closing station 321 assigned pairs of lens mold carriers 1 and 2 are mated, so that upon mating lens mold carrier 1 and lens mold carrier 2, the female molds 112 of lens mold carrier 1 and the respective male molds 212 of lens mold carrier 2 are mated to form mold cavities. All lens mold carriers 1 comprise female male mold units 11 with female molds 112 while the respective assigned lens mold carriers 2 comprise male mold units 21 with male molds 212. In the forming station 322, the respective male molds 212 and female molds 112 are moved into an intermediate closed position, in which the molds are not yet in their final closed position.

In the following, an example is described how lens mold carrier 1 and lens mold carrier 2 may work together in the manufacturing unit 32. As has been described above, the compartments 100 in frame 10 of lens mold carrier 1 and the compartments 200 in frame 20 of corresponding lens mold carrier 2 are very precisely arranged, and adapter piece 110 of female lens mold unit 11 is floatingly arranged in compartment 100 while adapter piece 210 of male lens mold unit 21 is floatingly arranged in compartment 200. Due to the precise arrangement of the compartments 100 and 200 of the frames 10 and 20 the sleeves 111 and 211 are already coarsely aligned as the lens mold carrier 2 is moved towards lens mold carrier 1. During mating, the precise alignment of each pair of associated male mold units 21 and female mold units 11 is then performed automatically: As the rounded portion 2110 of the front end of sleeve 211 comes into contact with the chamfered portion 1110 of the front end of sleeve 111 during mating the lens mold carrier 1 carrying the female mold units 21 and the lens mold carrier 2, either one adapter piece or both adapter pieces of male mold unit 21 and female mold unit 11 move within their respective compartments until the sleeves are precisely aligned whereby the molds are precisely aligned with the aid of the cylindrical outer surface of sleeve 111 that extends over the female mold 112 and the inner surface of sleeve 211 that extends over the male mold 212. This happens with each pair of associated male mold units 21 and female mold units 11 and is possible due to the floating arrangement of the adapter pieces within the respective compartments. All male mold units 11 and female mold units 21 (including the male molds 212 and female molds 112) are then precisely aligned. The lens mold carriers are then further moved towards each other until the molds are closed, with the individual molds being perfectly aligned. Thereafter, the sleeves may be moved a small distance apart again so that the molds are in the intermediate closed position which is not the final closed position.

The mated lens mold carriers 1, 2 are then transferred to a third manufacturing unit 33.

Third manufacturing unit 33 comprises a curing station and a relative mold movement station 330, in which the lens forming material is cured, for example with the aid of UV-light. As is well-known, during UV-light curing the lens forming material is polymerized and/or crosslinked to form the contact lens, however, during curing shrinkage of the lens forming material is known to occur. As both the female molds 112 and the male molds 212 are reusable molds typically made of glass (e.g. quartz glass or any other suitable glass known in the art) the molds themselves cannot deform to compensate for the shrinkage. Therefore, a relative mold movement is performed such that the male and female molds are moved relative to each other from the afore-mentioned intermediate closed position to the final closed position in accordance with a predetermined movement profile which takes the shrinkage process into account, so that the shape of the contact lens is determined by the shape of the male and female molds in the final closed position. Such relative mold movement of the male and female molds is known in the art and can be performed in different ways, as is described, for example, in WO 2011/045397.

The mated lens mold carriers 1, 2 containing the formed contact lenses are then transferred to a fourth manufacturing unit 34.

Fourth manufacturing unit 34 labelled "ORW" comprises an opening station 340 in which the mated lens mold carriers 1, 2 are separated thus opening the molds, a rinsing station 341 for rinsing away excess lens forming material, and a lens removal station 342 labelled "Waterflow" for removal of the contact lens from the mold and for transferring the contact lens from the manufacturing module MM to the extraction module EM. The lens removal station has been labelled "Waterflow" as removal of the contact lens from the mold and transfer of the contact lens from the manufacturing module MM to the extraction module EM can be performed with the aid of a flow of fluid, for example water, as this is known in the art and described, for example, in WO 2008/116856.

Once the contact lenses are transferred from the manufacturing module MM to the extraction module EM, the lens mold carrier 1 with the female mold units 11 comprising the female molds 112 and the lens mold carrier 2 with the male mold units 21 comprising the male molds 212 are transferred to a fifth manufacturing unit 35.

Fifth manufacturing unit 35 labelled "MCD" comprises a mold cleaning station 350 for cleaning the molds, a rinsing station 351 for a final rinse of the molds, and a subsequent drying station 352 for drying the molds, for example with the aid of air having a well-defined humidity of the drying air. The carrier 1 with the female mold units 11 and the cleaned, rinsed and dried female molds 112 as well as the carrier 2 with the male mold units 21 and the cleaned rinsed and dried molds are then returned to the first manufacturing station labelled "CTI", thus closing the loop and starting the described lens manufacturing process for the next production cycle.

The material flow of the contact lens in the manufacturing module MM is indicated in FIG. 2 by continuous lines whereas the flow of the lens mold carriers or the molds, respectively, in the manufacturing module MM is indicated by dashed lines.

The manufacturing module MM described above in connection with the diagrammatic representation in FIG. 2 is shown in FIG. 3 again in a more structure-related schematic representation showing the arrangement of the individual manufacturing units 30, 32, 33, 34 and 35, as well as the (optional) inkjet printing station 310. As can be seen, transfer robots 36 are arranged between the first manufacturing unit 30 labelled "CTI" and inkjet printing station 310, between inkjet printing station and second manufacturing unit 32 labelled "DCF", between second manufacturing unit 32 labelled "DCF" and third manufacturing unit 33 labelled "RMM/UVL", between the third manufacturing unit 33 labelled "RMM/UVL" and fourth manufacturing unit 34 labelled "ORW", between fourth manufacturing unit 34 labelled "ORW" and fifth manufacturing unit labelled "MCD", and between fifth manufacturing unit 35 labelled "MCD" and first manufacturing unit labelled "CTI". Transfer robots 36 transfer lens mold carriers 1, 2 from one manufacturing unit to the next manufacturing unit. This configuration of the manufacturing module MM is advantageous as it is easily possible to make changes to the manufacturing module MM. For example, additional manufacturing stations or manufacturing units can be added to or manufacturing stations or manufacturing units can be removed from the manufacturing module MM, or the existing manufacturing stations can be rearranged at different locations within the manufacturing module MM. In each such case, it is only necessary to make the robots transfer the lens mold carriers to the location of the respective new location of the next manufacturing unit or manufacturing station. In the case of adding an additional manufacturing station or manufacturing unit to the manufacturing module MM, one or more additional robots are needed.

Turning back to FIG. 2, transfer of the contact lenses from the manufacturing module MM to the extraction module EM is performed in the removal station 342 labelled "Waterflow", as has been described above. The contact lenses are transferred through plastic tubes into containers waiting in a receiving station 400 of the extraction module EM for the contact lenses to arrive. As the lens mold carriers described above comprise fourteen molds each, fourteen contact lenses are produced at the same time. Accordingly, fourteen contact lenses are transferred from the manufacturing module MM to the extraction module EM at the same time. Consequently, fourteen containers are respectively provided in a receiving station for receiving the fourteen contact lenses transferred from the removal station 342 (labelled "Waterflow") of the manufacturing module MM. Containers suitable to transport the contact lenses through the different stations of the extraction module EM are known for example, from WO 2011/045384.

The manufacturing process performed in the manufacturing module MM typically is a cyclic process performed with a predetermined cycle time for all process steps. This holds for the extraction and treatment process performed in the extraction module EM, too. However, as the cycle time of the manufacturing process performed in the manufacturing module MM and the cycle time of the extraction and treatment process performed in the extraction module EM may be different, in order to account for such difference in cycle times an apparatus for transferring the contact lenses between the manufacturing module MM and the extraction module EM can be used as is disclosed in WO 2012/080468.

In the extraction module, the contact lenses are received in the afore-mentioned containers in a receiving station 400 labelled "IN (Water)" and are subsequently transported through different dipping baths. For that purpose, an apparatus as disclosed in WO 2011/045380 can be used, for example. The contact lenses contained in the containers are first transported from the receiving station 400 (labelled "IN (Water)") to an extraction station 401 (which may comprise one or more extraction baths) where unwanted substances, for example non-polymerized and/or non-crosslinked lens forming material or solvents, are extracted from the contact lenses. Thereafter, the contact lenses contained in the containers are again transported to a neutralization station 402 (labelled "Water") which may comprise one or more water baths. Subsequently, the contact lenses contained in the containers are transported to a coating station 403 (which may comprise one or more coating baths) for applying a coating to the contact lenses. Thereafter, the contact lenses contained in the containers are again transported to a neutralization station 404 (labelled "Water" again) before they are transported to a transfer station 405 (labelled "OUT (Water)") from where the contact lenses contained in the container are transferred from the extraction module EM to an inspection module IM for inspection as this is represented by the continuous line in FIG. 3 starting at the base of transfer station 405 and ending at the first inspection station of the inspection module IM. The containers of the extraction module EM are then returned to the receiving station 400 (labelled "IN (Water)") as is indicated by the dashed lines in FIG. 3.

Removal of the contact lenses from the containers at the transfer station 405 of extraction module EM and transfer of the contact lenses into inspection cuvettes waiting in the inspection module IM can be performed using a suitable gripper. Inspection cuvettes suitable for being used in the inspection module IM are known, for example, from WO 03/016855, while a gripper suitable for the transfer of the contact lenses from the containers of extraction module EM into the inspection cuvettes waiting in inspection module IM is disclosed in WO 2012/066060, for example.

In the inspection module IM, the contact lenses contained in the inspection cuvettes are first inspected in a first inspection station 500 of the inspection module IM as to whether or not the contact lenses are inverted. By way of example, such type of inspection can be performed in the manner described in WO 2015/036432. In case the result of this inspection is that a contact lens is inverted, the contact lens can be re-inverted in a second inspection station 501 of the inspection module in order to thereafter have the contact lens arranged in the inspection cuvette in the correct inversion state (i.e. the contact lens is non-inverted). Re-inversion of the contact lens can be performed in the manner described in WO 2009/103732, for example. Once in the proper inversion state, the contact lens is inspected for cosmetic defects such as bubbles, inclusions, edge defects (e.g. tears), etc., in a third inspection station 502 of the inspection module IM. This cosmetic inspection can be performed in the manner described in WO 2007/060173, for example. In a subsequent fourth inspection station 503 (labelled "Diopter measurement"), the contact lens is inspected to determine its optical parameters such as the optical power. This can be performed in the manner described in WO 2014/049053, for example. Finally, in a fifth inspection station 504 (labelled "CT measurement") the contact lens is inspected to determine the central thickness of the contact lens, and this can be performed, for example, in the manner described in WO 2014/049050. The sequence of the inspection stations in inspection module IM is not limited to the sequence shown in FIG. 2, at least the three last inspection stations can be arranged in a different sequence (however, inspection of the contact lens should occur with the contact lens being in the proper inversion state).

In case a contact lens has failed to pass one or more of the inspections performed in the third inspection station 502 ("Cosmetic inspection"), the fourth inspection station 503 ("Diopter measurement") or the fifth inspection station 504 ("CT measurement"), such contact lens is sorted out and discarded. Contact lenses that have passed all of the afore-mentioned inspection steps are transferred into a primary package waiting in a lens placement station of a (primary) packaging module PP, as this is indicated by the continuous line. A primary package suitable for this purpose and comprising a packaging shell and a foil sealed to the top surface of the packaging shell is described, for example, in U.S. Pat. No. 5,609,246. The inspection cuvettes are cleaned and returned to the first inspection station 500 where contact lenses coming from the extraction module EM are transferred into the inspection cuvettes in the inspection module IM again, as this is indicated by the dashed lines.

In the (primary) packaging module PP, in a first packaging station 600 (labelled "Shell feeder") packaging shells are supplied. In a second, optional packaging station 601 (labelled "Print on shell") various information may be printed on the shell (such as, for example, date of production, contact lens data, etc.). Next, in a third packaging station 602 the packaging shells are placed on a carrier on which the packaging shells are further transported through the packaging module PP. For example, five packaging shells are arranged on the same carrier. In a subsequent fourth packaging station 603, the contact lenses that have successfully passed all inspections in the inspection module IM are placed into the packaging shells arranged on the carrier, until each of the packaging shells contains a contact lens (in each of the individual packaging shells on the same carrier the same type of contact lens is contained). The transfer of a contact lens out of the inspection cuvettes used in the inspection module and into a packaging shell arranged on the carrier can be performed, with the aid of a gripper. A gripper suitable for this transfer is described in WO 2011/026868, for example.

In the fifth packaging station 604 (labelled "lens presence check") it is determined whether in each of the packaging shells a contact lens is contained in order to prevent a packaging shell from being sealed with a foil with no contact lens being contained in the packaging shell for any reason (for example, a contact lens has not been properly placed in the packaging shell, or a gripper has indicated that a contact lens has adhered to the gripper and has been placed into the shell although actually no contact lens has adhered to the gripper). The lens presence check can be performed, for example, with the aid of a camera suitable to read the ink code of the contact lens which does not only indicate the presence of the contact lens in the packaging shell but can also be used to check (by identification of the ink code) whether the correct contact lens is contained in the packaging shell.

The carrier is then moved to a sixth packaging station 605 (labelled "Configuration station") which is an optional station. The configuration station is a kind of an intermediate buffer in which contact lenses can be temporarily stored in packaging shells (without a foil being sealed thereto), however, only for a predetermined time so as to prevent the contact lenses in the packaging shells from drying. If it has been detected in the fifth packaging station 604 ("lens presence check") that there is one or more shells arranged on the carrier in which no contact lens is contained, a check is performed whether one or more shells containing a contact lens of the same type are present in the configuration station. In case such packaging shell is present in the configuration station, the shell on the carrier that does not contain a contact lens is removed from the carrier and is the corresponding shell containing the same type of contact lens is taken from the configuration station and is placed on the carrier instead.

As the configuration station is optional only, in case there is no configuration station and it is detected during the lens presence check performed in the fifth packaging station 604 that a contact lens is missing in one or more of the packaging shells on a carrier, then the whole arrangement of shells on that carrier is discarded (since the shells arranged on the same carrier are typically sealed together to form a strip as will be described below, and this would mean that in one or more of the shells of a strip no contact lens is contained, which is not acceptable).

In a seventh packaging station 606 (labelled "Dose saline") a predetermined amount of packaging liquid is dispensed (dosed) into each of the packaging shells.

It is of course also possible to arrange the fifth packaging station 604 ("lens presence check") downstream of the seventh packaging station 606 ("Dose saline"), in particular as it may turn out that the lens identification code is difficult to read as the contact lens may not be completely unfolded without a sufficient amount of saline being present in the packaging shell.

In a subsequent eighth packaging station 607 (labelled "Place foil on shell") a foil, for example a laminated aluminum foil comprising a thermoplastic layer, is placed on the shell. Alternatively, as is well-known, a foil strip extending over a plurality of packaging shells adjacently arranged on a carrier is sealed to each of the adjacently arranged packaging shells to form a strip of contact lens packages in which the individual packages of the strip are connected to one another by the foil strip. The foil strip connecting the individual packages to the strip of contact lens packages can be scored or perforated at the connection between adjacent packages of the strip so as to allow for separation of an individual contact lens package from the strip.

Thereafter, in a ninth packaging station 608 (labelled "Sealing") the foil or the foil strip, respectively, is sealed to the packaging shell (or to the packages, respectively) at the top surface of the packaging shell. In a subsequent tenth packaging station 609 (labelled "Laser printing on foil") information (e.g. base curve radius, optical power, etc.) related to the contact lens contained in the package is printed on the foil, for example by using laser printing.

Dosing packaging liquid into the shell, lens presence check, placing and sealing of a foil to the shell, and laser printing are all conventional techniques and, therefore, they are not discussed in detail.

In an (optional) eleventh packaging step 610 (labelled "Pull samples") some sealed packages or strips of the sealed packages may be taken from the production line from time to time and may be inspected offline to make sure that the production line works well and to ensure quality of the packaged contact lenses. Finally, in a twelfth packaging step 611 (labelled "Blister into magazines") the sealed and printed contact lens packages or strips of contact lens packages are removed from the carriers and are placed into magazines for autoclaving. The carriers are then returned for the next packaging shells being placed on them.

Autoclaving of the contact lens packages or strips of contact lens packages is then performed in an autoclave 700, and once autoclaving is performed the autoclaved contact lens packages are further placed in a secondary packaging line 800 (labelled "Secondary packaging") into secondary packages, for example cartons, which form the final product 900 for subsequent shipping.

As has been mentioned above already, with the modular production line PL according to the invention, and in particular with the manufacturing module MM according to the invention, it is possible to perform a lot change on the fly, that is to say it is possible to exchange (replace) at least one of the molds on the lens mold carriers without the need to interrupt production and without the need to clear the production line by removing all lens mold carriers from the production line and place new lens mold carriers on the production line.

Figure 3:
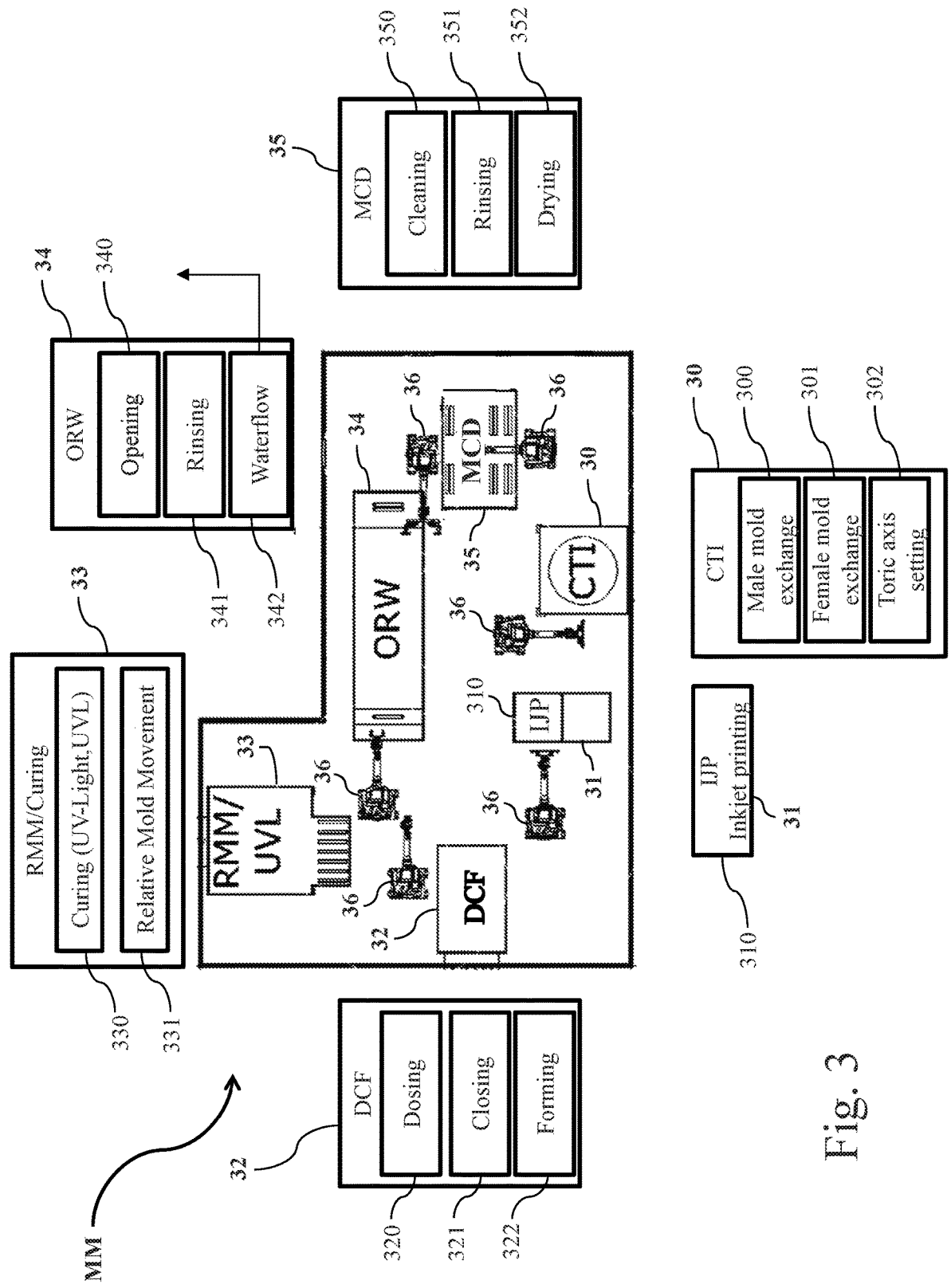
FIG. 3 shows an embodiment of the manufacturing module according to the invention.
Figure 11:
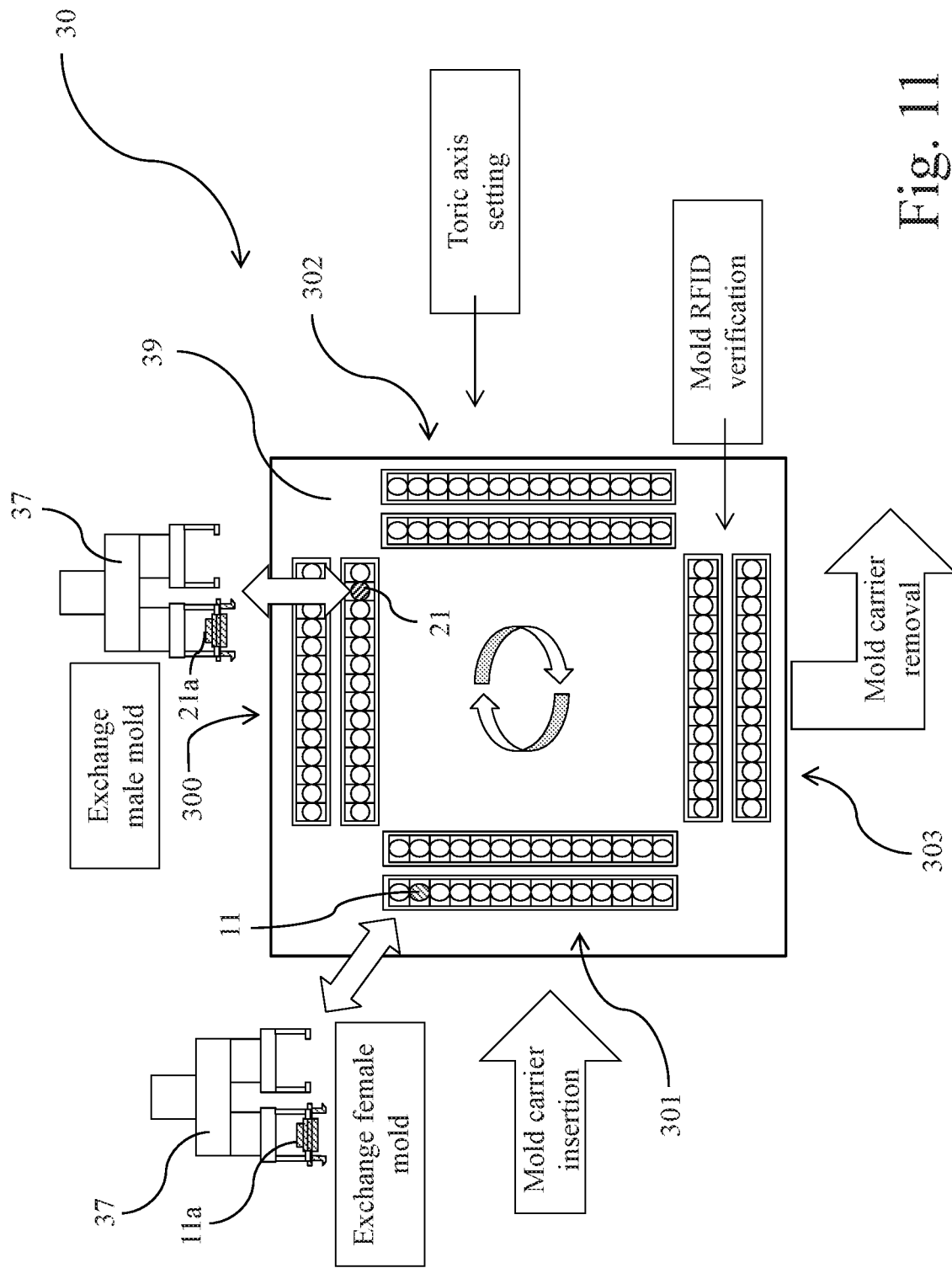
FIG. 11 shows an embodiment of the mold changing station of the manufacturing module according to the invention.

In the manufacturing module MM according to the invention, the lot change on the fly can be performed by the first manufacturing unit 30 (labelled "CTI") in FIG. 2 and FIG. 3. One example of such manufacturing unit 30 is shown in more detail in FIG. 11. Insertion and removal of the lens mold carriers 1, 2 into and from the manufacturing unit 30 are indicated by respective arrows. Manufacturing unit 30 comprises a rotary table 39 which can be rotated clockwise, for example, as is indicated in FIG. 11 by the curved arrows in the center of table 39. At station 301, female molds can be exchanged by removing female mold units 11 from their compartment 100 of lens mold carrier 1 and by mounting a different female mold unit 11a to the said compartment 100 of lens mold carrier 1 from which female mold unit 11 has been removed. For example, in FIG. 11 it is shown that female mold unit 11 arranged at position number two (hatched in FIG. 11) of lens mold carrier 1 is exchanged and replaced with a different mold unit 11a with the aid of a respective exchange tool 37, as will be described in more detail below with respect to FIG. 12. Once the exchange of female mold unit 11 is completed, rotary table 39 is rotated clockwise by ninety degrees so that at station 300 a male mold exchange can be performed. Exchange of a male mold unit 21 (and replacement swith a different male mold unit 21a) can be performed similar to an exchange of a female mold unit in the same manner using a similar mold exchange tool 37. By way of example, exchange of male mold unit 21 may be performed at position number two of lens mold carrier 2. The male and female mold exchanges (by exchanging the mold units) are indicated by double-headed arrows in FIG. 11. Once the exchange of the male mold unit 21 is completed, rotary table 39 is again rotated clockwise by ninety degrees, so that at station 302 a toric axis setting/change can be performed. This can be performed, for example, with a suitable rotation tool (not shown) which may engage the flat surfaces of sleeve 211 at the back end of male mold unit 21 (see FIG. 10) and rotate sleeve 211 either clockwise or counterclockwise by one or more teeth of the toothed adjusting ring 214, as this is already described further above. Once the toric axis setting/change is completed, table 39 is rotated again clockwise by ninety degrees so that in a further station 303 the individual RFIDS of the molds can be read and stored so that it is known what type of mold is arranged at what compartment 100, 200 of the lens mold carriers 1, 2. Lens mold carriers 1, 2 are then removed with the aid of a robot 36 and are transported to the next station, for example the inkjet printing station 310 as described above with respect to FIG. 2 and FIG. 3. It goes without saying, that either a male mold exchange, or a female mold exchange, or a toric axis change/setting can be performed in order to perform a lot change on the fly, or combinations thereof. If no lot change on the fly is to be performed, none of these exchanges/changes/settings is performed.

Figure 12:
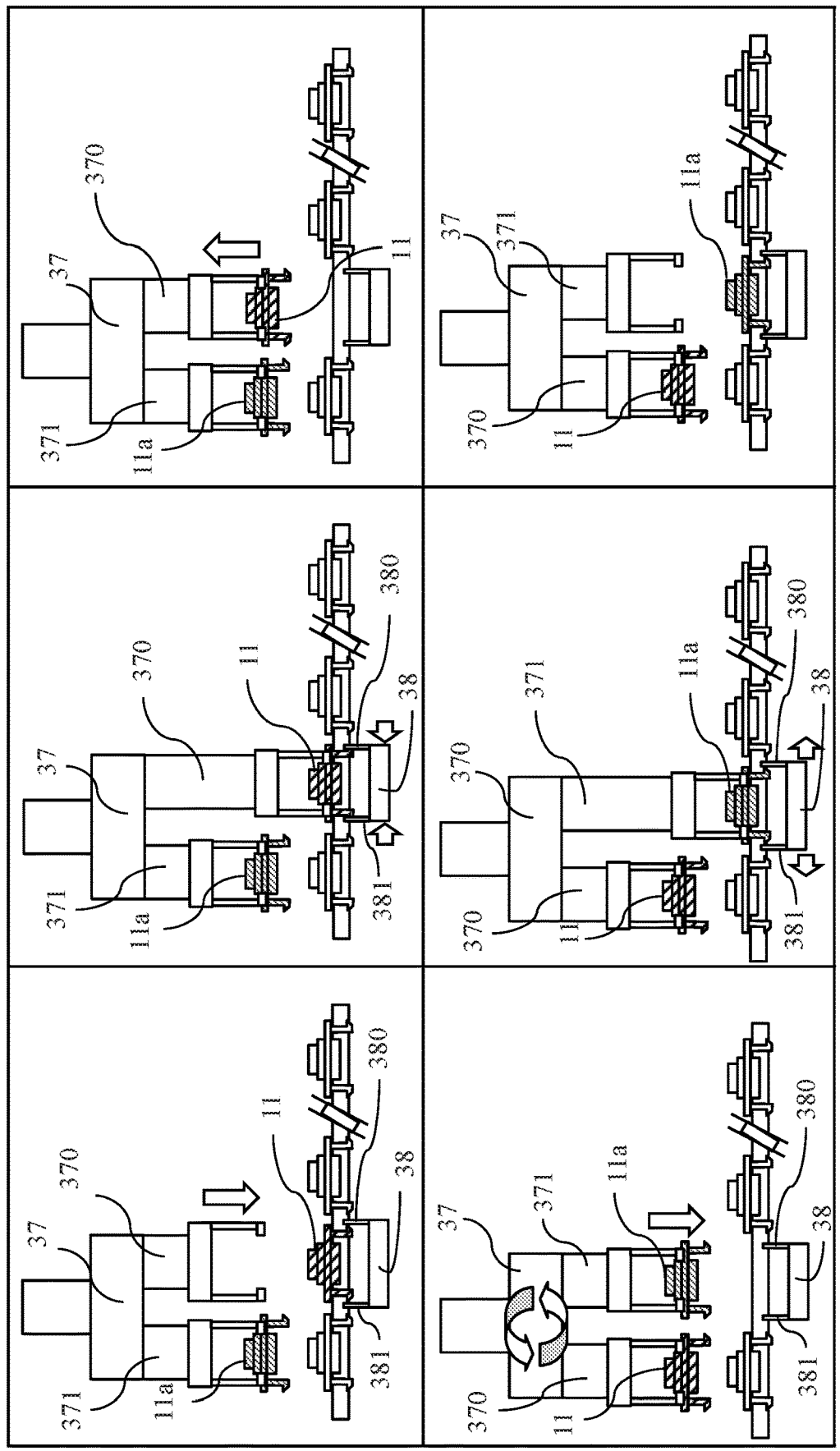
FIG. 12 shows the various states and actions performed during a mold exchange.

FIG. 12 shows the individual states during a female mold exchange performed with the aid of an exchange tool 37. In the upper left box of FIG. 12, exchange tool 37 is shown in its initial position. In this initial position, exchange tool 37 is arranged above female mold unit 11 arranged in the compartment 100 at position number two of lens mold carrier 1. Exchange tool 37 comprises two gripper arms 370, 371. Gripper arm 370 is empty and ready for gripping female mold unit 11 to be removed from compartment 100 of lens mold carrier 1 while gripper arm 371 holds a new female mold unit 11a to be inserted into the said compartment 100 of lens mold carrier 1 after female mold unit 11 has been removed. As can be seen further in FIG. 12, there is a snap fit release tool 38 having two arms 380, 381 that can be moved towards and away from each other. As is indicated by the arrow in the upper left box of FIG. 12, exchange tool 37 is then lowered from the initial position towards female mold unit 11 to be exchanged.

In the upper central box of FIG. 12, it is shown that gripper arm 370 of exchange tool 37 has been lowered until it engages female mold unit 11. Arms 380, 381 of snap fit release tool 38 are moved towards each other (see arrows) to flex resilient latches 113 (see FIG. 5) of female mold unit 11 inwardly. As can be seen in the upper right box of FIG. 12, gripper arm 370 of exchange tool 37 is then raised again (see arrow) with female mold unit being gripped by gripper arm 370, thus removing female mold unit 11 from compartment 100 of lens mold carrier 1. As can be seen in the lower left box of FIG. 12, exchange tool 37 is then rotated clockwise or counterclockwise by 180° thus arranging gripper arm 371 holding new female mold unit 11a to be inserted above the compartment 100 of lens mold carrier 1 from which female mold unit 11 has been removed. Gripper arm 371 of exchange tool 37 is then lowered (see arrow in lower left box of FIG. 12) until new female mold unit 11a is placed into compartment 100 of lens mold carrier 1. At that time, arms 380, 381 of snap fit release tool 38 are still in the position in which they have been moved towards each other to allow for easy insertion of the resilient latches of new female mold unit 11a into compartment 100 of lens mold carrier 1. Once new female mold unit 11a has been inserted into compartment 100 of lens mold carrier 1 as shown in the central lower box of FIG. 12, arms 380, 381 of snap fit release tool 38 are moved away from each other again (see arrows in central lower box of FIG. 12). New female mold unit 11a is now mounted to the frame of lens mold carrier 1 at compartment 100, and the exchange process.

While embodiments of the manufacturing unit according to the invention and of the production line according to the invention have been described above with the aid of the drawings, it is evident that many modifications and changes are possible without departing from the teaching underlying the invention. Therefore, the invention is not limited to the embodiments shown and described, but rather the scope of protection is defined by the appended claims.

The invention claimed is:

1. Manufacturing module for the manufacture of contact lenses, comprising a plurality of manufacturing stations comprising a male mold exchange station (300), a female mold exchange station (301), a toric axis setting station (302), an inkjet printing station (310), a dosing station (320), a closing station (321), a forming station (322), a curing station (330), a relative mold movement station (331), a mold opening station (340), a rinsing station (341), a removal station (342), a mold cleaning station (350), a mold rinsing station (351), and a mold drying station (352), wherein the plurality of manufacturing stations of the manufacturing module (MM) are grouped to form a plurality of individual manufacturing units comprising a first individual manufacturing unit (30); inkjet printing unit (31); a second individual manufacturing unit (32); a third individual manufacturing unit (33); a fourth individual manufacturing unit (34); a fifth individual manufacturing unit (35) arranged in a closed loop, and wherein the manufacturing module further comprises a plurality of transfer robots (36), each transfer robot (36) of the plurality of transfer robots being arranged at a location between two individual manufacturing units of the plurality of individual manufacturing modules and being configured to transfer lens mold carriers from one of the two individual manufacturing units between which the respective transfer robot is arranged to the other one of the individual manufacturing units between which the respective transfer robot is arranged.

2. Manufacturing module according to claim 1, wherein
a first individual manufacturing unit (30) of the plurality of manufacturing units comprises the male mold exchange station (300), the female mold exchange station (301), and the toric axis setting station (302),
a second individual manufacturing unit (32) of the plurality of manufacturing units comprises a dosing station (320) for dosing a lens forming material into the male or female molds, a closing station (321) for mating the assigned pairs of lens mold carriers, and a forming station (322) for moving the individual molds formed by the mated lens mold carriers to an intermediate closed position,
a third individual manufacturing unit (33) comprises a curing station (330) for curing the lens forming material to form lenses, in a UV-light station, and a relative mold movement station (331) configured to perform a relative movement of the male and female molds from the intermediate closed position to a final closed position during curing of the lens forming material,
a fourth individual manufacturing unit (34) comprises a mold opening station (340) for separating the assigned pairs of lens mold carriers, a rinsing station (341) for rinsing away any excess lens material from the molds, and a removal station (342) for removing the lenses from the molds and for transporting them away from the manufacturing module, and
a fifth individual manufacturing unit (35) comprises a mold cleaning station (350), a mold rinsing station (351), and a mold drying station (352).

3. Manufacturing module according to claim 1, wherein the inkjet printing station (310) is arranged between the first individual manufacturing unit (30) and the second individual manufacturing unit (32).

4. Production line (PL) for the production of contact lenses, comprising a manufacturing module (MM) according to claim 1, and further comprising an extraction and treatment module (EM) for the extraction of unwanted substances from the lenses and for chemical treatment of the lenses, an inspection module (IM) for the inspection of the extracted and chemically treated lenses, and a packaging module (PP) for packaging the lenses that have been identified by the inspection module (IM) as being acceptable.

5. Method of producing contact lenses, the method comprising manufacturing a plurality of lenses in a closed-loop manufacturing process in which different lots of lenses are simultaneously manufactured in a manufacturing module (MM) according to claim 1, the method comprising the steps of:
- dispensing a lens forming material into the female molds (112) of one lens mold carrier (1) of the respective pair of lens mold carriers or into the male molds (212) of the other lens mold carrier (2) of the respective pair of lens mold carriers,
- mating the two lens mold carriers of the respective pair of lens mold carriers to form the mold cavities with the lens forming material being enclosed in the mold cavities formed between the male and female molds,
- curing the lens forming material in the mold cavities to form the contact lenses,
- separating the two mated lens mold carriers of the respective pair of lens mold carriers,
- removing the contact lenses from the male or female molds,
- in the mold changing station, removing at least one mold from its mounting site on one of the two lens mold carriers of the respective pair of lens mold carriers and mounting a different mold to the said mounting site, or changing the rotational position of at least one of the molds mounted to the two lens mold carriers of the respective pair of lens mold carriers, or both.

6. Method according to claim 5, wherein in the mold changing station a said male mold (212) is removed from its mounting site (200) on the lens mold carrier (2) and a different male mold is mounted to the said mounting site (200).

7. Method according to claim 5, wherein in the mold changing station (300, 301, 302) a said female mold (112) is removed from its mounting site (100) on the lens mold carrier (1) and a different female mold is mounted to the said mounting site (100).

8. Method according to claim 5, wherein in the mold changing station (300, 301, 302) the rotational position of a said male or female mold (212, 112) is changed while the said male or female mold remains mounted to the lens mold carrier.

* * * * *